(12) United States Patent
Wang et al.

(10) Patent No.: US 11,240,774 B2
(45) Date of Patent: Feb. 1, 2022

(54) TIMING ADVANCE GROUP FOR NEW RADIO

(71) Applicant: QUALCOMM Incorporated, San Diego, CA (US)

(72) Inventors: Renqiu Wang, San Diego, CA (US); Wanshi Chen, San Diego, CA (US); Amir Aminzadeh Gohari, Sunnyvale, CA (US); Joseph Binamira Soriaga, San Diego, CA (US); Alexei Yurievitch Gorokhov, San Diego, CA (US); Hao Xu, Beijing (CN); Tingfang Ji, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/994,942

(22) Filed: May 31, 2018

(65) Prior Publication Data

US 2018/0352527 A1 Dec. 6, 2018

Related U.S. Application Data

(60) Provisional application No. 62/514,584, filed on Jun. 2, 2017.

(51) Int. Cl.
*H04W 56/00* (2009.01)
*H04L 5/00* (2006.01)
(Continued)

(52) U.S. Cl.
CPC ....... *H04W 56/0045* (2013.01); *H04L 1/1812* (2013.01); *H04L 5/0053* (2013.01);
(Continued)

(58) Field of Classification Search
CPC ... H04L 5/0053; H04L 5/0094; H04L 1/1812; H04W 56/00; H04W 56/0005; H04W 56/0045
See application file for complete search history.

(56) References Cited

U.S. PATENT DOCUMENTS

2011/0103499 A1* 5/2011 Cheng ............... H04W 56/0005
375/260
2015/0304977 A1 10/2015 Li
(Continued)

FOREIGN PATENT DOCUMENTS

CA 2862197 A1 8/2013
CN 103298136 A 9/2013

OTHER PUBLICATIONS

3GPP TSG-RAN WG4 Meeting #83 R4-1705306 Huangzhou, China, May 15-19, 2017 (Year: 2017).*
(Continued)

*Primary Examiner* — Omer S Mian
(74) *Attorney, Agent, or Firm* — Loza & Loza, LLP

(57) ABSTRACT

Aspects of the disclosure relate to communication systems, apparatus and methods which enable or support configuring timing advance in a radio access network. The method includes defining a timing advance configuration for a radio access network that employs a modulation scheme with scalable numerology, determining timing advance parameters consistent with the timing advance configuration for a user equipment (UE) that is in communication with the radio access network, and transmitting the timing advance parameters to the UE during an initial access procedure involving the UE or while the UE is in a connected state in the radio access network. The timing advance configuration may be defined to accommodate a numerology used by the radio access network.

32 Claims, 10 Drawing Sheets

(51) Int. Cl.
*H04L 1/18* (2006.01)
*H04W 72/04* (2009.01)

(52) U.S. Cl.
CPC .......... *H04L 5/0091* (2013.01); *H04W 56/00* (2013.01); *H04W 56/0005* (2013.01); *H04L 5/001* (2013.01); *H04L 5/0007* (2013.01); *H04W 72/0453* (2013.01)

(56) References Cited

U.S. PATENT DOCUMENTS

| | | | | |
|---|---|---|---|---|
| 2016/0302088 | A1* | 10/2016 | Eyuboglu | H04W 16/26 |
| 2018/0152907 | A1* | 5/2018 | Zhang | H04B 7/0421 |
| 2019/0053013 | A1* | 2/2019 | Markhovsky | G01S 5/10 |
| 2019/0223178 | A1* | 7/2019 | Bergstrom | H04W 72/0406 |

OTHER PUBLICATIONS

Alcatel-Lucent, et al., "Analysis of Impact of Cell Range Extension", 3GPP Draft; R1-094601, 3rd Generation Partnership Project (3GPP), Mobile Competence Centre, 650, Route Des Lucioles, F-06921, Sophia-Antipolis Cedex, France, No. Jeju; Nov. 9, 2009, Nov. 9, 2009, 3 Pages, XP050389012, [retrieved on Nov. 3, 2009].

Ericsson: "Consideration of Requirements for NR UE Timing Advance", 3GPP Draft; R4-1705306, 3rd Generation Partnership Project (3GPP), Mobile Competence Centre; 650, Route Des Lucioles; F-06921 Sophia Antipolis Cedex; France, vol. RAN WG4, No. Huangzhou, China; May 15, 2017-May 19, 2017, May 14, 2017 (May 14, 2017), 5 Pages, XP051277431, Retrieved from the Internet: URL: http://www.3gpp.org/ftp/Meetings_3GPP_SYNC/RAN4/Docs/ [retrieved on May 14, 2017].

International Search Report and Written Opinion—PCT/US2018/035734—ISA/EPO—dated Aug. 16, 2018.

Nokia, et al., "On System Design for Multiple Numerologies—Initial Access", 3GPP Draft; R1-167258, 3rd Generation Partnership Project (3GPP), Mobile Competence Centre; 650, Route Des Lucioles; F-06921 Sophia-Antipolis Cedex; France, vol. RAN WG1, No. Gothenburg, Sweden; Aug. 21, 2016, 6 Pages, XP051125795, Retrieved from the Internet: URL: http://www.3gpp.org/ftp/Meetings_3GPP_SYNC/RAN1/Docs/ [retrieved on Aug. 21, 2016].

Qualcomm Incorporated: "Timing Advance for Different Numerology", 3GPP Draft; R1-1718574 Timing Advance for Different Numerology, 3rd Generation Partnership Project (3GPP), Mobile Competence Centre; 650, Route Des Lucioles; F-06921 Sophia-Antipolis Cedex; France, vol. RAN WG1, No. Prague, CZ; Oct. 9, 2017-Oct. 13, 2017, Oct. 3, 2017 (Oct. 3, 2017), 1 Page, XP051353141, Retrieved from the Internet: URL: http://www.3gpp.org/ftp/tsg_ran/WG1_RL1/TSGR1_90b/Docs/ [retrieved Oct. 3, 2017].

Samsung: "On UL Transmission Timing Aspects", 3GPP Draft; R1-1714571 TA, 3rd Generation Partnership Project (3GPP), Mobile Competence Centre; 650, Route Des Lucioles; F-06921 Sophia-Antipolis Cedex; France, vol. RAN WG1, No. Prague, Czechia; Aug. 21, 2017-Aug. 25, 2017, Aug. 17, 2017 (Aug. 17, 2017), pp. 1-2, XP051328087, Retrieved from the Internet: URL: http://www.3gpp.org/ftp/tsg_ran/WG1_RL1/TSGR1_98/Docs/ [retrieved on Aug. 17, 2017].

* cited by examiner

TIMING ADVANCE GROUP FOR NEW RADIO

PRIORITY CLAIM

This application claims priority to and the benefit of U.S. Provisional Patent Application Ser. No. 62/514,584 filed in the U.S. Patent Office on Jun. 2, 2017, the entire content of this application being incorporated herein by reference as if fully set forth below in its entirety and for all applicable purposes.

TECHNICAL FIELD

The technology discussed below relates generally to wireless communication systems, and more particularly, to controlling timing of transmissions in radio access networks.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). These multiple-access technologies have been adopted in various telecommunication standards to provide a common protocol that enables different wireless devices to communicate on a municipal, national, regional, and even global level.

For example, fifth generation (5G) New Radio (NR) communications technology is envisaged to expand and support diverse usage scenarios and applications with respect to current mobile network generations. In an aspect, 5G communications technology includes enhanced mobile broadband addressing human-centric use cases for access to multimedia content, services and data; ultra-reliable-low latency communications (URLLC) with strict requirements, especially in terms of latency and reliability; and massive machine type communications for a very large number of connected devices and typically transmitting a relatively low volume of non-delay-sensitive information.

Wireless communication networks are being utilized to provide and support an even broader range of services for various types of devices with different capabilities. While some devices can operate within the available bandwidth of the communication channels, requirements for uplink control channels in devices employing NR access technologies may be unmet or unattainable in conventional network implementations.

As the demand for mobile broadband access continues to increase, research and development continue to advance wireless communication technologies not only to meet the growing demand for mobile broadband access, but to advance and enhance the user experience with mobile communications.

BRIEF SUMMARY OF SOME EXAMPLES

The following presents a simplified summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

In one example, a method for timing advance in a radio access network is disclosed. The method includes defining a timing advance configuration for a radio access network that employs a modulation scheme with scalable numerology, determining timing advance parameters consistent with the timing advance configuration for user equipment (UE) that is in communication with the radio access network, and transmitting the timing advance parameters to the UE during an initial access procedure involving the UE or while the UE is in a connected state in the radio access network. The timing advance configuration may be defined to accommodate a numerology used by the radio access network.

Defining the timing advance configuration may include configuring a timing advance step size for one or more subcarrier spacing defined for the radio access network. Defining the timing advance configuration may include configuring a timing advance step size for all subcarrier spacings defined for the radio access network.

In some instances, a group of subcarrier spacings is defined for the radio access networks and defining the timing advance configuration may include configuring a timing advance step size for subcarrier spacings in the group of subcarrier spacings. The group of subcarrier spacings may include subcarrier spacings of 15 kHz, 30 kHz and 60 kHz. The group of subcarrier spacings may include subcarrier spacings of 120 kHz and 240 kHz.

Defining the timing advance configuration may include configuring a number of bits used to express a timing advance duration transmitted to the UE in the timing advance parameters. Defining the timing advance configuration may include configuring a timing advance step size for one or more subcarrier spacings defined for the radio access network. The timing advance step size and the number of bits used to express the timing advance value are selected to obtain a maximum timing advance duration or range of the radio access network with a desired timing advance granularity. The desired timing advance granularity is determined by hybrid automatic repeat request (HARQ) timing. Defining the timing advance configuration may include configuring a timing advance step size for one or more subcarrier spacings defined for the radio access network. The timing advance step size and the number of bits used to express the timing advance value are selected to obtain a maximum timing advance duration defined by the radio access network for HARQ.

Defining the timing advance configuration may include configuring the number of bits used to express the timing advance duration based on a timing advance step size for one or more subcarrier spacings defined for the radio access network.

Defining the timing advance configuration may include configuring a first number of bits used to express the timing advance duration when the UE is configured to operate as an enhanced mobile broadband (eMBB) UE, and configuring a second number of bits used to express the timing advance duration when the UE is configured to operate as an ultra-reliable-low latency communications (URLLC) UE.

Defining the timing advance configuration may include configuring a first timing advance step size when the UE is configured to operate as an eMBB UE, and configuring a second timing advance step size when the UE is configured to operate as an URLLC UE.

Defining the timing advance configuration may include configuring one or more timing advance step size for subcarrier spacings based on frequency ranges used by the radio access network. The radio access network may be configurable to use bandwidths associated with sub-6 GHz frequencies and millimeter wavelengths.

In another example, an apparatus for wireless communication includes means for defining a timing advance configuration for a radio access network that employs a modulation scheme with scalable numerology, means for determining timing advance parameters consistent with the timing advance configuration for a UE that is in communication with the radio access network, and transmitting the timing advance parameters to the UE during an initial access procedure involving the UE or while the UE is in a connected state in the radio access network. The timing advance configuration may be defined to accommodate a numerology used by the radio access network.

In another example, an apparatus for wireless communication includes means for defining a timing advance configuration for a radio access network that employs a modulation scheme with scalable numerology, adapted to define the timing advance configuration to accommodate a numerology used by the radio access network, means for determining timing advance parameters consistent with the timing advance configuration for a UE that is in communication with the radio access network, and means for transmitting the timing advance parameters to the UE during an initial access procedure involving the UE or while the UE is in a connected state in the radio access network.

The means for defining the timing advance configuration may be adapted to configure a timing advance step size for one or more subcarrier spacing defined for the radio access network. The means for defining the timing advance configuration may be adapted to configure a timing advance step size for all subcarrier spacings defined for the radio access network.

In some instances, a group of subcarrier spacings is defined for the radio access network, and the means for defining the timing advance configuration is adapted to configure a timing advance step size for subcarrier spacings in the group of subcarrier spacings. The means for defining the timing advance configuration may be adapted to configure a cyclic prefix length for each subcarrier spacing in the group of subcarrier spacings.

The means for defining the timing advance configuration may configure a number of bits used to express a timing advance duration transmitted to the UE in the timing advance parameters based on a timing advance step size for one or more subcarrier spacings defined for the radio access network. The means for defining the timing advance configuration may configure a timing advance step size for one or more subcarrier spacings defined for the radio access network. The timing advance step size and the number of bits used to express the timing advance duration may be selected to obtain a maximum timing advance duration or range of the radio access network with a desired timing advance granularity. The means for defining the timing advance configuration may be adapted to configure a timing advance step size for one or more subcarrier spacings defined for the radio access network. The timing advance step size and the number of bits used to express the timing advance duration may be selected to obtain a maximum timing advance duration defined by the radio access network for HARQ.

In some implementations, the means for defining the timing advance configuration may be adapted to configure a first number of bits used to express a timing advance duration when the UE is configured to operate as an eMBB UE, and configure a second number of bits used to express the timing advance duration when the UE is configured to operate as an URLLC UE. The means for defining the timing advance configuration may be adapted to configure a first timing advance step size when the UE is configured to operate as an eMBB UE, and configure a second timing advance step size when the UE is configured to operate as an URLLC UE. The means for defining the timing advance configuration may be adapted to configure one or more timing advance step size for subcarrier spacings based on frequency ranges used by the radio access network. The radio access network may be configurable to use bandwidths associated with sub-6 GHz frequencies and millimeter wavelengths.

In another example, an apparatus for wireless communication has a processor, a transceiver communicatively coupled to the at least one processor, and a memory communicatively coupled to the at least one processor. The processor may be configured to define a timing advance configuration for a radio access network that employs a modulation scheme with scalable numerology, determine timing advance parameters consistent with the timing advance configuration for a UE that is in communication with the radio access network, and transmit the timing advance parameters to the UE during an initial access procedure involving the UE or while the UE is in a connected state in the radio access network. The timing advance configuration is defined to accommodate a numerology used by the radio access network.

A group of subcarrier spacings may be defined for the radio access network, and the processor may be configured to configure a timing advance step size for subcarrier spacings in the group of subcarrier spacings. The processor may be configured to configure a timing advance step size for one or more subcarrier spacings defined for the radio access network. The timing advance step size and the number of bits used to express the timing advance duration may be selected to obtain a maximum timing advance duration or range of the radio access network with a desired timing advance granularity.

In another example, a computer-readable medium stores computer-executable code. The code may cause a computer to define a timing advance configuration for a radio access network that employs a modulation scheme with scalable numerology, determine timing advance parameters consistent with the timing advance configuration for a UE that is in communication with the radio access network, and transmit the timing advance parameters to the UE during an initial access procedure involving the UE or while the UE is in a connected state in the radio access network. The timing advance configuration may be defined to accommodate a numerology used by the radio access network.

These and other aspects of the invention will become more fully understood upon a review of the detailed description, which follows. Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Aspects of the disclosure relate to communication systems, apparatus and methods which enable or support configuring a timing advance in a radio access network. A timing advance configuration may be defined for a radio access network that employs a modulation scheme with scalable numerology. Timing advance parameters consistent with the timing advance configuration may be configured for a UE that is in communication with the radio access network. The timing advance parameters may be transmitted to the UE during an initial access procedure involving the UE or while the UE is in a connected state in the radio access network. The timing advance configuration may be defined to accommodate a numerology used by the radio access network.

Figure 1:
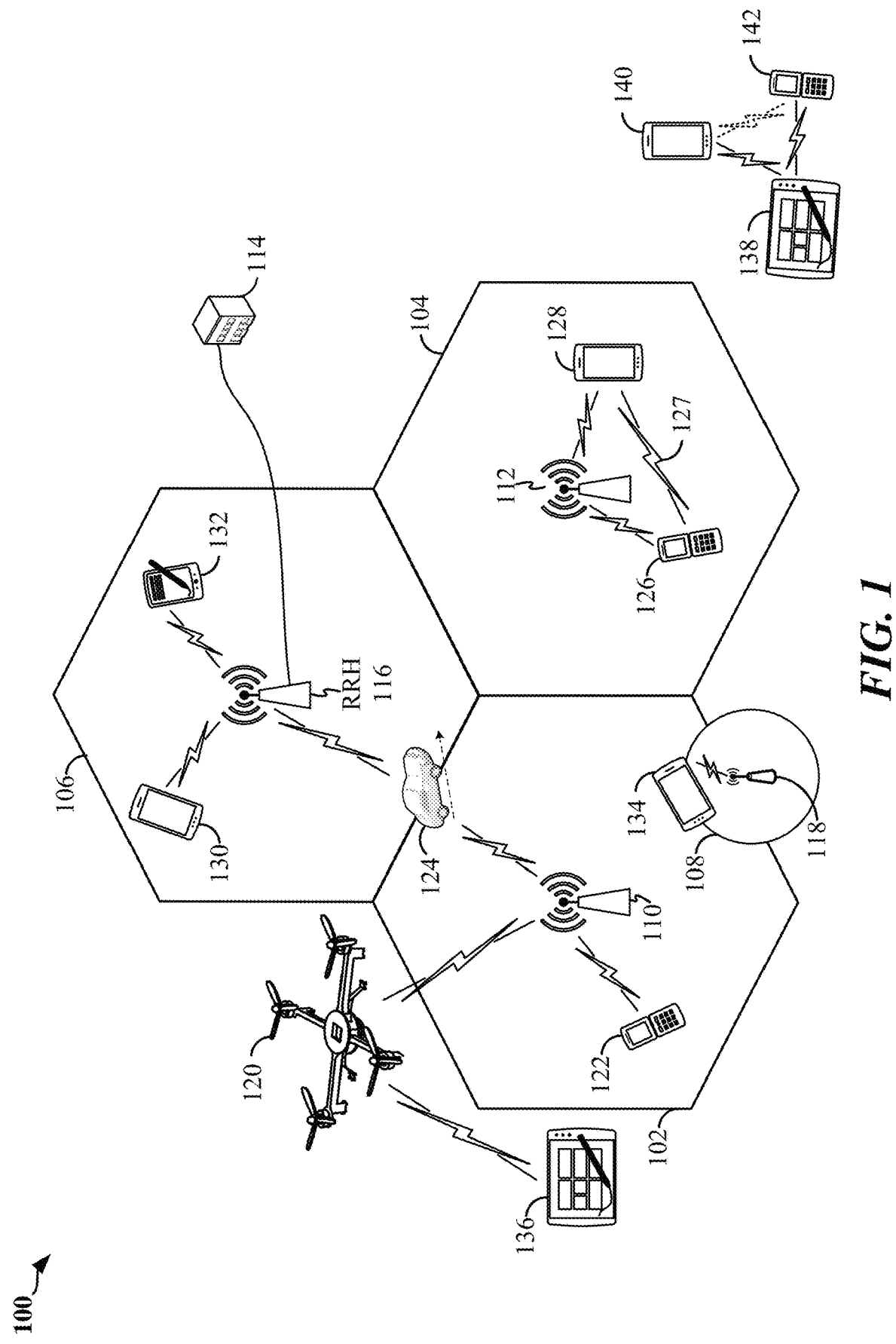
FIG. 1 is a conceptual illustration of an example of a radio access network.

The various concepts presented throughout this disclosure may be implemented across a broad variety of telecommunication systems, network architectures, and communication standards. Referring now to FIG. 1, as an illustrative example without limitation, a schematic illustration of a radio access network 100 is provided.

The geographic region covered by the radio access network 100 may be divided into a number of cellular regions (cells) that can be uniquely identified by a user equipment (UE) based on an identification broadcasted over a geographical area from one access point or base station. FIG. 1 illustrates macrocells 102, 104, and 106, and a small cell 108, each of which may include one or more sectors. A sector is a sub-area of a cell. All sectors within one cell are served by the same base station. A radio link within a sector can be identified by a single logical identification belonging to that sector. In a cell that is divided into sectors, the multiple sectors within a cell can be formed by groups of antennas with each antenna responsible for communication with UEs in a portion of the cell.

In general, a base station (BS) serves each cell. Broadly, a base station is a network element in a radio access network responsible for radio transmission and reception in one or more cells to or from a UE. A BS may also be referred to by those skilled in the art as a base transceiver station (BTS), a radio base station, a radio transceiver, a transceiver function, a basic service set (BSS), an extended service set (ESS), an access point (AP), a Node B (NB), an eNode B (eNB), a gNode B (gNB), or some other suitable terminology.

In FIG. 1, two high-power base stations 110 and 112 are shown in cells 102 and 104; and a third high-power base station 114 is shown controlling a remote radio head (RRH) 116 in cell 106. That is, a base station can have an integrated antenna or can be connected to an antenna or RRH by feeder cables. In the illustrated example, the cells 102, 104, and 106 may be referred to as macrocells, as the high-power base stations 110, 112, and 114 support cells having a large size. Further, a low-power base station 118 is shown in the small cell 108 (e.g., a microcell, picocell, femtocell, home base station, home Node B, home eNode B, etc.) which may overlap with one or more macrocells. In this example, the cell 108 may be referred to as a small cell, as the low-power base station 118 supports a cell having a relatively small size. Cell sizing can be done according to system design as well as component constraints. It is to be understood that the radio access network 100 may include any number of wireless base stations and cells. Further, a relay node may be deployed to extend the size or coverage area of a given cell. The base stations 110, 112, 114, 118 provide wireless access points to a core network for any number of mobile apparatuses.

FIG. 1 further includes a quadcopter or drone 120, which may be configured to function as a base station. That is, in some examples, a cell may not necessarily be stationary, and the geographic area of the cell may move according to the location of a mobile base station such as the quadcopter 120.

In general, base stations may include a backhaul interface for communication with a backhaul portion of the network. The backhaul may provide a link between a base station and a core network, and in some examples, the backhaul may provide interconnection between the respective base stations. The core network is a part of a wireless communication system that is generally independent of the radio access technology used in the radio access network. Various types of backhaul interfaces may be employed, such as a direct physical connection, a virtual network, or the like using any suitable transport network. Some base stations may be configured as integrated access and backhaul (IAB) nodes, where the wireless spectrum may be used both for access links (i.e., wireless links with UEs), and for backhaul links. This scheme is sometimes referred to as wireless self-backhauling. By using wireless self-backhauling, rather than requiring each new base station deployment to be outfitted with its own hard-wired backhaul connection, the wireless spectrum utilized for communication between the base station and UE may be leveraged for backhaul communication, enabling fast and easy deployment of highly dense small cell networks.

The radio access network 100 is illustrated supporting wireless communication for multiple mobile apparatuses. A mobile apparatus is commonly referred to as user equipment (UE) in standards and specifications promulgated by the 3rd Generation Partnership Project (3GPP), but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. A UE may be an apparatus that provides a user with access to network services.

Within the present document, a "mobile" apparatus need not necessarily have a capability to move, and may be stationary. The term mobile apparatus or mobile device broadly refers to a diverse array of devices and technologies. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an "Internet of things" (IoT). A mobile apparatus may additionally be an automotive or other transportation vehicle, a remote sensor or actuator, a robot or robotics device, a satellite radio, a global positioning system (GPS) device, an object tracking device, a drone, a multi-copter, a quad-copter, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, etc.; an industrial automation and enterprise device; a logistics controller; agricultural equipment; military defense equipment, vehicles, aircraft, ships, and weaponry, etc. Still further, a mobile apparatus may provide for connected medicine or telemedicine support, i.e., health care at a distance. Telehealth devices may include telehealth monitoring devices and telehealth administration devices, whose communication may be given preferential treatment or prioritized access over other types of information, e.g., in terms of prioritized access for transport of critical service data, and/or relevant QoS for transport of critical service data.

Within the radio access network 100, the cells may include UEs that may be in communication with one or more sectors of each cell. For example, UEs 122 and 124 may be in communication with base station 110; UEs 126 and 128 may be in communication with base station 112; UEs 130 and 132 may be in communication with base station 114 by way of RRH 116; UE 134 may be in communication with low-power base station 118; and UE 136 may be in communication with mobile base station 120. Here, each base station 110, 112, 114, 118, and 120 may be configured to provide an access point to a core network (not shown) for all the UEs in the respective cells. Transmissions from a base station (e.g., base station 110) to one or more UEs (e.g., UEs 122 and 124) may be referred to as downlink (DL) transmission, while transmissions from a UE (e.g., UE 122) to a base station may be referred to as uplink (UL) transmissions. In accordance with certain aspects of the present disclosure, the term downlink may refer to a point-to-multipoint transmission originating at a scheduling entity (e.g., the core network 202). Another way to describe this scheme may be to use the term broadcast channel multiplexing. In accordance with further aspects of the present disclosure, the term uplink may refer to a point-to-point transmission originating at a scheduled entity.

In some examples, a mobile network node (e.g., quad-copter 120) may be configured to function as a UE. For example, the quadcopter 120 may operate within cell 102 by communicating with base station 110. In some aspects of the disclosure, two or more UEs (e.g., UEs 126 and 128) may communicate with each other using peer to peer (P2P) or sidelink signals 127 without relaying that communication through a base station (e.g., base station 112). Sidelink signals 127 may include sidelink traffic and sidelink control information. Sidelink control information may in some examples include a request signal, such as a request-to-send (RTS), a source transmit signal (STS), and/or a direction selection signal (DSS). The request signal may provide for a scheduled entity (e.g., UEs 126 and 128) to request a duration of time to keep a sidelink channel available for a sidelink signal 127. Sidelink control information may further include a response signal, such as a clear-to-send (CTS) and/or a destination receive signal (DRS). The response signal may provide for the UEs 126, 128 to indicate the availability of the sidelink channel, e.g., for a requested duration of time. An exchange of request and response signals (e.g., handshake) may enable different scheduled entities performing sidelink communications to negotiate the availability of the sidelink channel prior to communication of the sidelink traffic information.

In the radio access network 100, the ability for a UE to communicate while moving, independent of its location, is referred to as mobility. The various physical channels between the UE and the radio access network are generally set up, maintained, and released under the control of a mobility management entity (MME). In various aspects of the disclosure, a radio access network 100 may utilize DL-based mobility or UL-based mobility to enable mobility and handovers (i.e., the transfer of a UE's connection from one radio channel to another). In a network configured for DL-based mobility, during a call with a scheduling entity, or at any other time, a UE may monitor various parameters of the signal from its serving cell as well as various parameters of neighboring cells. Depending on the quality of these parameters, the UE may maintain communication with one or more of the neighboring cells. During this time, if the UE moves from one cell to another, or if signal quality from a neighboring cell exceeds that from the serving cell for a given amount of time, the UE may undertake a handoff or handover from the serving cell to the neighboring (target) cell. For example, UE 124 (illustrated as a vehicle, although any suitable form of UE may be used) may move from the geographic area corresponding to its serving cell 102 to the geographic area corresponding to a neighbor cell 106. When the signal strength or quality from the neighbor cell 106 exceeds that of its serving cell 102 for a given amount of time, the UE 124 may transmit a reporting message to its serving base station 110 indicating this condition. In response, the UE 124 may receive a handover command, and the UE may undergo a handover to the cell 106.

In a network configured for UL-based mobility, UL reference signals from each UE may be utilized by the network to select a serving cell for each UE. In some examples, the base stations 110, 112, and 114/116 may broadcast unified synchronization signals (e.g., unified Primary Synchronization Signals (PSSs), unified Secondary Synchronization Signals (SSSs) and unified Physical Broadcast Channels (PBCH)). The UEs 122, 124, 126, 128, 130, and 132 may receive the unified synchronization signals, derive the carrier frequency and slot timing from the synchronization signals, and in response to deriving timing, transmit an uplink pilot or reference signal. The uplink pilot signal transmitted by a UE (e.g., UE 124) may be concurrently received by two or more cells (e.g., base stations 110 and 114/116) within the radio access network 100. Each of the cells may measure a strength of the pilot signal, and the radio access network (e.g., one or more of the base stations 110 and 114/116 and/or a central node within the core network) may determine a serving cell for the UE 124. As the UE 124 moves through the radio access network 100, the network may continue to monitor the uplink pilot signal transmitted by the UE 124. When the signal strength or quality of the pilot signal measured by a neighboring cell exceeds that of the signal strength or quality measured by the serving cell, the radio access network 100 may handover the UE 124 from the serving cell to the neighboring cell, with or without informing the UE 124.

Although the synchronization signal transmitted by the base stations 110, 112, and 114/116 may be unified, the synchronization signal may not identify a particular cell, but rather may identify a zone of multiple cells operating on the same frequency and/or with the same timing. The use of zones in 5G networks or other next generation communication networks enables the uplink-based mobility framework and improves the efficiency of both the UE and the network, since the number of mobility messages that need to be exchanged between the UE and the network may be reduced.

In various implementations, the air interface in the radio access network 100 may utilize licensed spectrum, unlicensed spectrum, or shared spectrum. Licensed spectrum provides for exclusive use of a portion of the spectrum, generally by virtue of a mobile network operator purchasing a license from a government regulatory body. Unlicensed spectrum provides for shared use of a portion of the spectrum without need for a government-granted license. While compliance with some technical rules is generally still required to access unlicensed spectrum, generally, any operator or device may gain access. Shared spectrum may fall between licensed and unlicensed spectrum, wherein technical rules or limitations may be required to access the spectrum, but the spectrum may still be shared by multiple operators and/or multiple RATs. For example, the holder of a license for a portion of licensed spectrum may provide licensed shared access (LSA) to share that spectrum with other parties, e.g., with suitable licensee-determined conditions to gain access.

In some examples, access to the air interface may be scheduled, wherein a scheduling entity (e.g., a base station) allocates resources for communication among some or all devices and equipment within its service area or cell. Within the present disclosure, as discussed further below, the scheduling entity may be responsible for scheduling, assigning, reconfiguring, and releasing resources for one or more scheduled entities. That is, for scheduled communication, UEs or scheduled entities utilize resources allocated by the scheduling entity.

Base stations are not the only entities that may function as a scheduling entity. That is, in some examples, a UE may function as a scheduling entity, scheduling resources for one or more scheduled entities (e.g., one or more other UEs). In other examples, sidelink signals may be used between UEs without necessarily relying on scheduling or control information from a base station. For example, UE 138 is illustrated communicating with UEs 140 and 142. In some examples, the UE 138 is functioning as a scheduling entity or a primary sidelink device, and UEs 140 and 142 may function as a scheduled entity or a non-primary (e.g., secondary) sidelink device. In still another example, a UE 138 may function as a scheduling entity in a device-to-device (D2D), peer-to-peer (P2P), or vehicle-to-vehicle (V2V) network, and/or in a mesh network. In a mesh network example, UEs 140 and 142 may optionally communicate directly with one another in addition to communicating with the UE 138 that is functioning as the scheduling entity.

Thus, in a wireless communication network with scheduled access to time-frequency resources and having a cellular configuration, a P2P configuration, or a mesh configuration, a scheduling entity and one or more scheduled entities may communicate utilizing the scheduled resources. A scheduling entity may broadcast traffic to one or more scheduled entities (the traffic may be referred to as downlink traffic). Broadly, the scheduling entity is a node or device responsible for scheduling traffic in a wireless communication network, including the downlink transmissions and, in some examples, uplink traffic from one or more scheduled entities to the scheduling entity. Broadly, the scheduled entity is a node or device that receives control information, including but not limited to scheduling information (e.g., a grant), synchronization or timing information, or other control information from another entity in the wireless communication network such as the scheduling entity.

Figure 2:
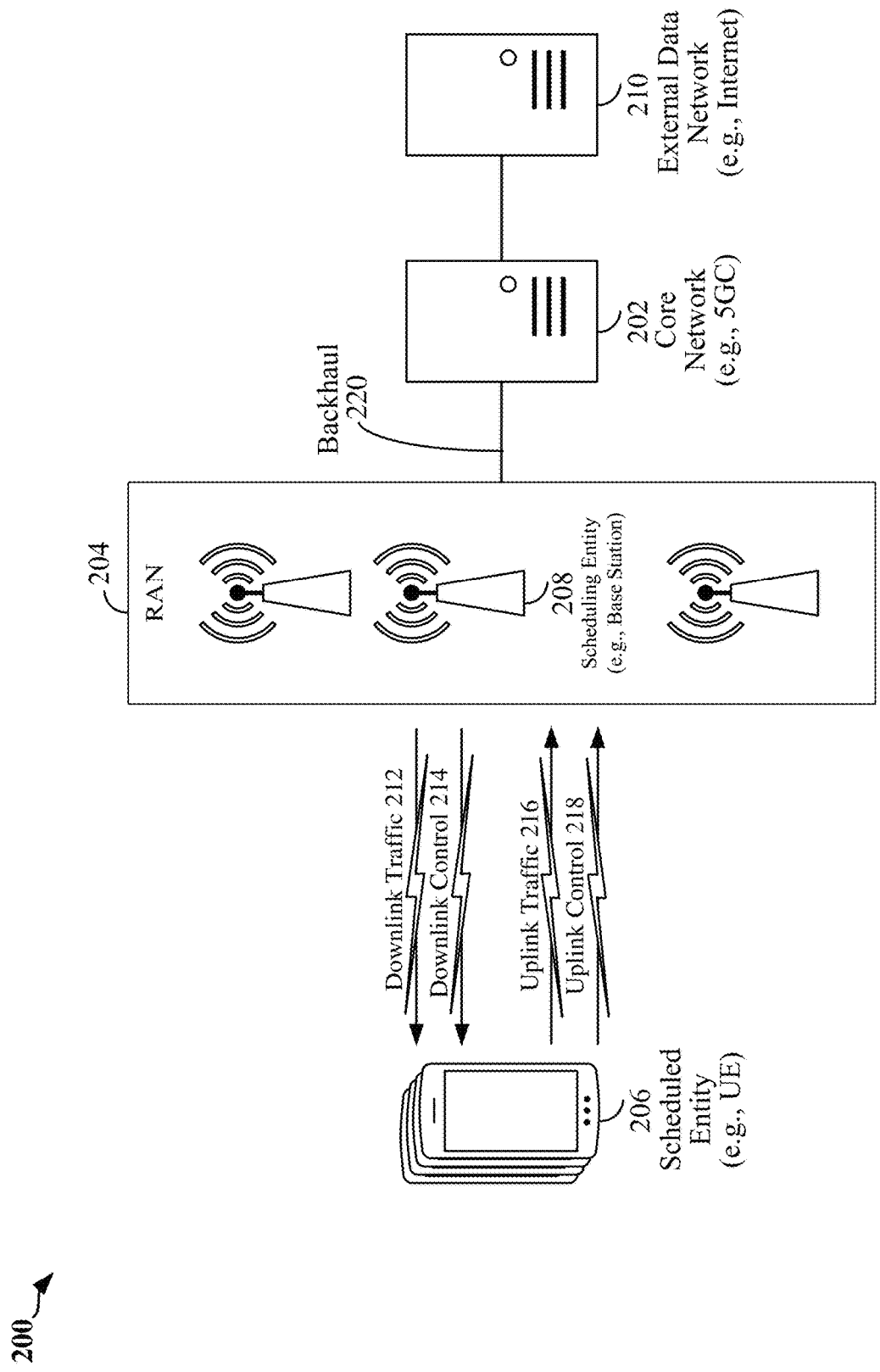
FIG. 2 is a schematic illustration of a wireless communication system.

Referring now to FIG. 2, as an illustrative example without limitation, various aspects of the present disclosure are illustrated with reference to a wireless communication system 200. The wireless communication system 200 includes three interacting domains: a core network 202, a radio access network (RAN) 204, and UE (scheduled entity 206). By virtue of the wireless communication system 200, the UE may be enabled to carry out data communication with an external data network 210, such as (but not limited to) the Internet.

The RAN 204 may implement any suitable wireless communication technology or technologies to provide radio access to the UE. As one example, the RAN 204 may operate according to $3^{rd}$ Generation Partnership Project (3GPP) New Radio (NR) specifications, often referred to as 5G or 5G NR. As another example, the RAN 204 may operate under a hybrid of 5G NR and Evolved Universal Terrestrial Radio Access Network (eUTRAN) standards, often referred to as LTE. The 3GPP refers to this hybrid RAN as a next-generation RAN, or NG-RAN. Of course, many other examples may be utilized within the scope of the present disclosure.

As illustrated, the RAN 204 includes a plurality of scheduling entities 208 including one or more base stations. Broadly, a base station is a network element in a radio access network responsible for radio transmission and reception in one or more cells to or from a UE. In different technologies, standards, or contexts, a base station may variously be referred to by those skilled in the art as a base transceiver station (BTS), a radio base station, a radio transceiver, a transceiver function, a basic service set (BSS), an extended service set (ESS), an access point (AP), a Node B (NB), an eNode B (eNB), a gNode B (gNB), or some other suitable terminology.

The RAN 204 is further illustrated supporting wireless communication for multiple mobile apparatuses. A mobile apparatus may be referred to as user equipment (UE) in 3GPP standards, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. A UE may be an apparatus that provides a user with access to network services.

Wireless communication between a RAN 204 and a UE may be described as utilizing an air interface. Transmissions over the air interface from a scheduling entity 208 (e.g., a base station) to one or more scheduled entities 206 (e.g., one or more UEs) may be referred to as downlink (DL) transmission. In accordance with certain aspects of the present disclosure, the term downlink may refer to a point-to-multipoint transmission originating at a scheduling entity 208 (described further below; e.g., base station). Another way to describe this scheme may be to use the term broadcast channel multiplexing. Transmissions from a scheduled entity 206 (e.g., a UE) to a scheduling entity 208 (e.g., a base station) may be referred to as uplink (UL) transmissions. In accordance with further aspects of the present disclosure, the term uplink may refer to a point-to-point transmission originating at a scheduled entity 206 (described further below; e.g., UE).

In some examples, access to the air interface may be scheduled, wherein a scheduling entity 208 (e.g., a base station) allocates resources for communication among some or all devices and equipment within its service area or cell. Within the present disclosure, as discussed further below, the scheduling entity may be responsible for scheduling, assigning, reconfiguring, and releasing resources for one or more scheduled entities. That is, for scheduled communication, UEs, which may be scheduled entities 206, may utilize resources allocated by the scheduling entity.

Base stations are not the only entities that may function as scheduling entities. That is, in some examples, a UE may function as a scheduling entity, scheduling resources for one or more scheduled entities (e.g., one or more other UEs).

As illustrated in FIG. 2, a scheduling entity 208 (e.g., a base station) may broadcast downlink traffic 212 to one or more scheduled entities 206. Broadly, the scheduling entity 208 is a node or device responsible for scheduling traffic in a wireless communication network, including the downlink traffic 212 and, in some examples, uplink traffic 216 from one or more scheduled entities 206 to the scheduling entity 208. On the other hand, the scheduled entity 206 is a node or device that receives downlink control information 214, including but not limited to scheduling information (e.g., a grant), synchronization or timing information, or other control information from another entity in the wireless communication network such as the scheduling entity 208.

In general, base stations may include a backhaul interface for communication with a backhaul portion 220 of the wireless communication system. The backhaul portion 220 may provide a link between a base station in the RAN 204 and the core network 202. Further, in some examples, a backhaul network may provide interconnection between the respective base stations in the RAN 204. Various types of backhaul interfaces may be employed, such as a direct physical connection, a virtual network, or the like using any suitable transport network.

The core network 202 may be a part of the wireless communication system 200, and may be independent of the radio access technology used in the RAN 204. In some examples, the core network 202 may be configured according to 5G standards (e.g., 5GC). In other examples, the core network 202 may be configured according to a 4G evolved packet core (EPC), or any other suitable standard or configuration.

The air interface in a radio access network 204 may utilize one or more duplexing algorithms Duplex refers to a point-to-point communication link where both endpoints can communicate with one another in both directions. Full duplex means both endpoints can simultaneously communicate with one another. Half duplex means only one endpoint can send information to the other at a time. In a wireless link, a full duplex channel generally relies on physical isolation of a transmitter and receiver, and suitable interference cancellation technologies. Full duplex emulation is frequently implemented for wireless links by utilizing frequency division duplex (FDD) or time division duplex (TDD). In FDD, transmissions in different directions operate at different carrier frequencies. In TDD, transmissions in different directions on a given channel are separated from one another using time division multiplexing. That is, at some times the channel is dedicated for transmissions in one direction, while at other times the channel is dedicated for transmissions in the other direction, where the direction may change very rapidly, e.g., several times per slot.

Figure 3:
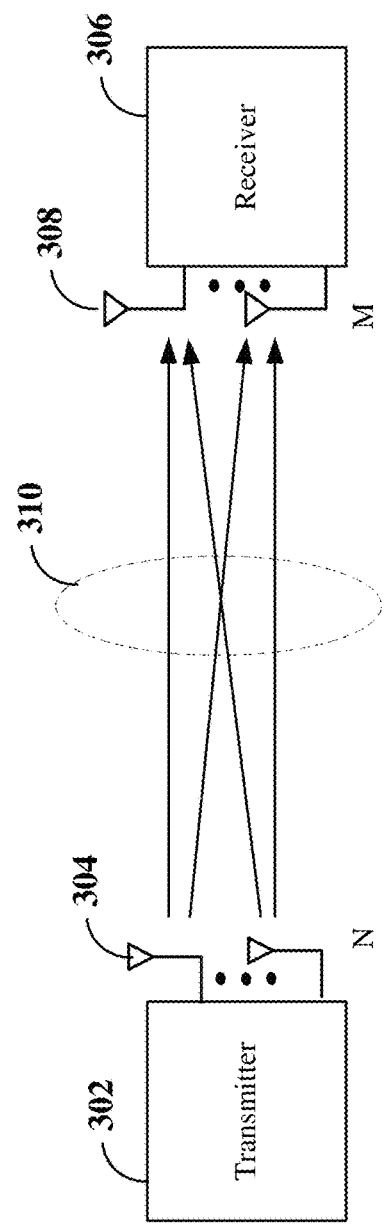
FIG. 3 is a block diagram illustrating a wireless communication system supporting multiple-input multiple-output (MIMO) communication.

In some aspects of the disclosure, the scheduling entity and/or scheduled entity may be configured for beamforming and/or MIMO technology. FIG. 3 illustrates an example of a wireless communication system 300 supporting MIMO. In the wireless communication system 300, a transmitter 302 includes multiple transmit antennas 304 (e.g., N transmit antennas) and a receiver 306 includes multiple receive antennas 308 (e.g., M receive antennas). Thus, there are N×M signal paths 310 from the transmit antennas 304 to the receive antennas 308. Each of the transmitter 302 and the receiver 306 may be implemented, for example, within a scheduling entity (such as the core network 202 of FIG. 2), a scheduled entity 206, or any other suitable wireless communication device.

The use of such multiple antenna technology enables the wireless communication system to exploit the spatial domain to support spatial multiplexing, beamforming, and transmit diversity. Spatial multiplexing may be used to transmit different streams of data, also referred to as layers, simultaneously on the same time-frequency resource. The data streams may be transmitted to a single UE to increase the data rate or to multiple UEs to increase the overall system capacity, the latter being referred to as multi-user MIMO (MU-MIMO). This is achieved by spatially precoding each data stream (i.e., multiplying the data streams with different weighting and phase shifting) and then transmitting each spatially precoded stream through multiple transmit antennas on the downlink. The spatially precoded data streams arrive at the UE(s) with different spatial signatures, which enables each of the UE(s) to recover the one or more data streams destined for that UE. On the uplink, each UE transmits a spatially precoded data stream, which enables the base station to identify the source of each spatially precoded data stream.

The number of data streams or layers corresponds to the rank of the transmission. In general, the rank of the transmission in the wireless communication system 300 supporting MIMO is limited by the number of transmit or receive antennas 304 or 308, whichever is lower. In addition, the channel conditions at the UE, as well as other considerations, such as the available resources at the base station, may also affect the transmission rank. For example, the rank (and therefore, the number of data streams) assigned to a particular UE on the downlink may be determined based on the rank indicator (RI) transmitted from the UE to the base station. The RI may be determined based on the antenna configuration (e.g., the number of transmit and receive antennas) and a measured signal-to-interference-and-noise ratio (SINR) on each of the receive antennas. The RI may indicate, for example, the number of layers that may be supported under the current channel conditions. The base station may use the RI, along with resource information (e.g., the available resources and amount of data to be scheduled for the UE), to assign a transmission rank to the UE.

In Time Division Duplex (TDD) systems, the UL and DL are reciprocal, in that each uses different time slots of the same frequency bandwidth. Therefore, in TDD systems, the base station may assign the rank for DL MIMO transmissions based on UL SINR measurements (e.g., based on a Sounding Reference Signal (SRS) transmitted from the UE or other pilot signal). Based on the assigned rank, the base station may then transmit the CSI-RS with separate C-RS sequences for each layer to provide for multi-layer channel estimation. From the CSI-RS, the UE may measure the channel quality across layers and resource blocks and feed back the CQI and RI values to the base station for use in updating the rank and assigning REs for future downlink transmissions.

In the simplest case, as shown in FIG. 3, a rank-2 spatial multiplexing transmission on a 2×2 MIMO antenna configuration will transmit one data stream from each transmit antenna 304. Each data stream reaches each receive antenna 308 along a different signal path 310. The receiver 306 may then reconstruct the data streams using the received signals from each receive antenna 308.

In order for transmissions over the radio access network 100 to obtain a low block error rate (BLER) while still achieving very high data rates, channel coding may be used. That is, wireless communication may generally utilize a suitable error correcting block code. In a typical block code, an information message or sequence is split up into code blocks (CBs), and an encoder (e.g., a CODEC) at the transmitting device then mathematically adds redundancy to the information message. Exploitation of this redundancy in the encoded information message can improve the reliability of the message, enabling correction for any bit errors that may occur due to the noise.

In 5G NR specifications, user data is coded using quasi-cyclic low-density parity check (LDPC) with two different base graphs: one base graph is used for large code blocks and/or high code rates, while the other base graph is used otherwise. Control information and the physical broadcast channel (PBCH) are coded using Polar coding, based on nested sequences. For these channels, puncturing, shortening, and repetition are used for rate matching.

However, those of ordinary skill in the art will understand that aspects of the present disclosure may be implemented utilizing any suitable channel code. Various implementations of scheduling entities 208 and scheduled entities 206 may include suitable hardware and capabilities (e.g., an encoder, a decoder, and/or a CODEC) to utilize one or more of these channel codes for wireless communication.

The air interface in the radio access network 100 may utilize one or more multiplexing and multiple access algorithms to enable simultaneous communication of the various devices. For example, 5G NR specifications provide multiple access for UL transmissions from UEs 122 and 124 to base station 110, and for multiplexing for DL transmissions from base station 110 to one or more UEs 122 and 124, utilizing 01-DM with a cyclic prefix (CP). In addition, for UL transmissions, 5G NR specifications provide support for discrete Fourier transform-spread-OFDM (DFT-s-OFDM) with a CP (also referred to as single-carrier FDMA (SC-FDMA)). However, within the scope of the present disclosure, multiplexing and multiple access are not limited to the above schemes, and may be provided utilizing time division multiple access (TDMA), code division multiple access (CDMA), frequency division multiple access (FDMA), sparse code multiple access (SCMA), resource spread multiple access (RSMA), or other suitable multiple access schemes. Further, multiplexing DL transmissions from the base station 110 to UEs 122 and 124 may be provided utilizing time division multiplexing (TDM), code division multiplexing (CDM), frequency division multiplexing (FDM), OFDM, sparse code multiplexing (SCM), or other suitable multiplexing schemes.

Various aspects of the present disclosure will be described with reference to an OFDM waveform 400, schematically illustrated in FIG. 4. It should be understood by those of ordinary skill in the art that the various aspects of the present disclosure may be applied to a DFT-s-OFDMA waveform in substantially the same way as described herein below. That is, while some examples of the present disclosure may focus on an OFDM link for clarity, it should be understood that the same principles may be applied as well to DFT-s-OFDMA waveforms.

Within the present disclosure, a frame refers to a duration of 10 ms for wireless transmissions, with each frame consisting of 10 subframes of 1 ms each. On a given carrier, there may be one set of frames in the UL, and another set of frames in the DL. Referring now to FIG. 4, an expanded view of an exemplary DL subframe 402 is illustrated, showing an OFDM resource grid 404. However, as those skilled in the art will readily appreciate, the PHY transmission structure for any particular application may vary from the example described here, depending on any number of factors. Here, time is in the horizontal direction with units of OFDM symbols; and frequency is in the vertical direction with units of subcarriers or tones.

The resource grid 404 may be used to schematically represent time-frequency resources for a given antenna port. That is, in a MIMO implementation with multiple antenna ports available, a corresponding multiple number of resource grids 404 may be available for communication. The resource grid 404 is divided into multiple resource elements (REs) 406. An RE, which is 1 subcarrier×1 symbol, is the smallest discrete part of the time-frequency grid, and contains a single complex value representing data from a physical channel or signal. Depending on the modulation utilized in a particular implementation, each RE may represent one or more bits of information. In some examples, a block of REs may be referred to as a physical resource block (PRB) or more simply a resource block (RB) 408, which contains any suitable number of consecutive subcarriers in the frequency domain. In one example, an RB may include 12 subcarriers, a number independent of the numerology used. In some examples, depending on the numerology, an RB may include any suitable number of consecutive OFDM symbols in the time domain. Within the present disclosure, it is assumed that a single RB such as the RB 408 entirely corresponds to a single direction of communication (either transmission or reception for a given device).

A UE generally utilizes only a subset of the resource grid 404. An RB may be the smallest unit of resources that can be allocated to a UE. Thus, the more RBs scheduled for a UE, and the higher the modulation scheme chosen for the air interface, the higher the data rate for the UE.

In this illustration, the RB 408 is shown as occupying less than the entire bandwidth of the subframe 402, with some subcarriers illustrated above and below the RB 408. In a given implementation, the subframe 402 may have a bandwidth corresponding to any number of one or more RBs 408. Further, in this illustration, the RB 408 is shown as occupying less than the entire duration of the subframe 402, although this is merely one possible example.

Each 1 ms subframe 402 may consist of one or multiple adjacent slots. In the example shown in FIG. 4, one subframe 402 includes four slots 410, as an illustrative example. In some examples, a slot may be defined according to a specified number of OFDM symbols with a given cyclic prefix (CP) length. For example, a slot may include 7 or 14 OFDM symbols with a nominal CP. Additional examples may include mini-slots having a shorter duration (e.g., one or two OFDM symbols). These mini-slots may in some cases be transmitted occupying resources scheduled for ongoing slot transmissions for the same or for different UEs.

An expanded view of one of the slots 410 illustrates the slot 410 including a control region 412 and a data region 414. In general, the control region 412 may carry control channels (e.g., PDCCH), and the data region 414 may carry data channels (e.g., PDSCH or PUSCH). Of course, a slot may contain all DL, all UL, or at least one DL portion and at least one UL portion. The simple structure illustrated in FIG. 4 is merely exemplary in nature, and different slot structures may be utilized, and may include one or more of each of the control region(s) and data region(s).

Figure 4:
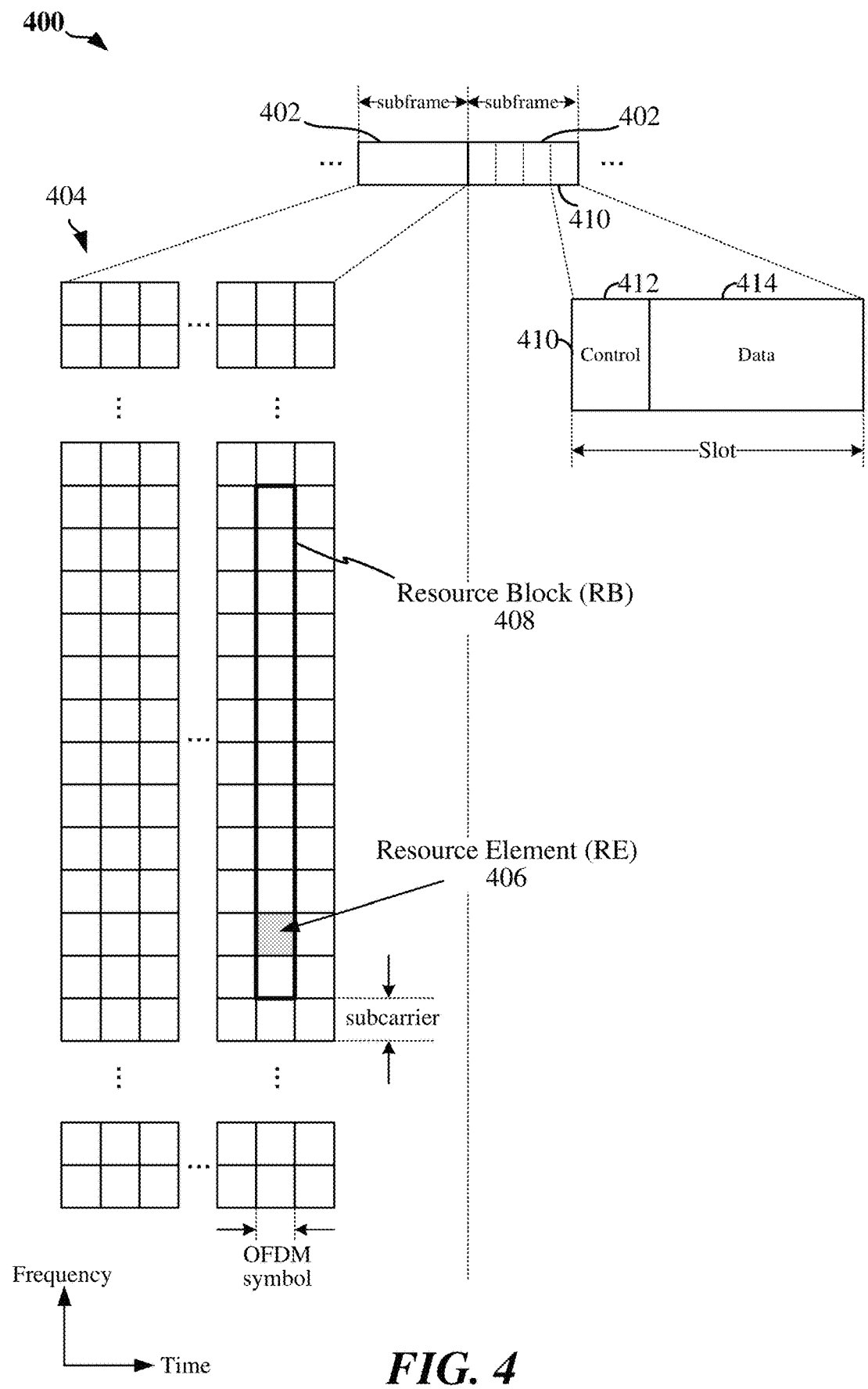
FIG. 4 is a schematic illustration of an organization of wireless resources in an air interface utilizing orthogonal frequency divisional multiplexing (OFDM).

Although not illustrated in FIG. 4, the various REs 406 within an RB 408 may be scheduled to carry one or more physical channels, including control channels, shared channels, data channels, etc. Other REs 406 within the RB 408 may also carry pilots or reference signals, including but not limited to a demodulation reference signal (DMRS) a control reference signal (CRS), or a sounding reference signal (SRS). These pilots or reference signals may provide for a receiving device to perform channel estimation of the corresponding channel, which may enable coherent demodulation/detection of the control and/or data channels within the RB 408.

In a DL transmission, the transmitting device (e.g., the scheduling entity 208) may allocate one or more REs 406 (e.g., within a control region 412) to carry DL control information 214 including one or more DL control channels, such as a PBCH; a PSS; an SSS; a physical control format indicator channel (PCFICH); a physical hybrid automatic repeat request (HARQ) indicator channel (PHICH); and/or a physical downlink control channel (PDCCH), etc., to one or more scheduled entities 206. The PCFICH provides information to assist a receiving device in receiving and decoding the PDCCH. The PDCCH carries downlink control information (DCI) including but not limited to power control commands, scheduling information, a grant, and/or an assignment of REs for DL and UL transmissions. The PHICH carries HARQ feedback transmissions such as an acknowledgment (ACK) or negative acknowledgment (NACK). HARQ is a technique well-known to those of ordinary skill in the art, wherein the integrity of packet transmissions may be checked at the receiving side for accuracy, e.g., utilizing any suitable integrity checking mechanism, such as a checksum or a cyclic redundancy check (CRC). If the integrity of the transmission confirmed, an ACK may be transmitted, whereas if not confirmed, a NACK may be transmitted. In response to a NACK, the transmitting device may send a HARQ retransmission, which may implement chase combining, incremental redundancy, etc.

In an UL transmission, the transmitting device (e.g., the scheduled entity 206) may utilize one or more REs 406 to carry UL control information 218 including one or more UL control channels, such as a physical uplink control channel (PUCCH), to the scheduling entity 208. UL control information 218 may include a variety of packet types and categories, including pilots, reference signals, and information configured to enable or assist in decoding uplink data transmissions. In some examples, the UL control information 218 may include a scheduling request (SR), i.e., request for the scheduling entity 208 to schedule uplink transmissions. Here, in response to the SR transmitted in the PUCCH, the scheduling entity 208 may transmit downlink control information 214 that may schedule resources for uplink packet transmissions. UL control information may also include HARQ feedback, channel state feedback (CSF), or any other suitable UL control information.

In addition to control information, one or more REs 406 (e.g., within the data region 414) may be allocated for user data or traffic data. Such traffic may be carried on one or more traffic channels, such as, for a DL transmission, a physical downlink shared channel (PDSCH); or for an UL transmission, a physical uplink shared channel (PUSCH). In some examples, one or more REs 406 within the data region 414 may be configured to carry system information blocks (SIBs), carrying information that may enable access to a given cell.

The channels or carriers described above and illustrated in FIGS. 2 and 4 are not necessarily all the channels or carriers that may be utilized between a scheduling entity 208 and scheduled entities 206, and those of ordinary skill in the art will recognize that other channels or carriers may be utilized in addition to those illustrated, such as other traffic, control, and feedback channels.

These physical channels described above are generally multiplexed and mapped to transport channels for handling at the medium access control (MAC) layer. Transport channels carry blocks of information called transport blocks (TB). The transport block size (TBS), which may correspond to a number of bits of information, may be a controlled parameter, based on the modulation and coding scheme (MCS) and the number of RBs in a given transmission.

In OFDM, to maintain orthogonality of the subcarriers or tones, the subcarrier spacing may be equal to the inverse of the symbol period. A numerology of an OFDM waveform refers to its particular subcarrier spacing and cyclic prefix (CP) overhead. A scalable numerology refers to the capability of the network to select different subcarrier spacings, and accordingly, with each spacing, to select the corresponding symbol duration, including the CP length. With a scalable numerology, a nominal subcarrier spacing (SCS) may be scaled upward or downward by integer multiples. In this manner, regardless of CP overhead and the selected SCS, symbol boundaries may be aligned at certain common multiples of symbols (e.g., aligned at the boundaries of each 1 ms subframe). The range of SCS may include any suitable SCS. For example, a scalable numerology may support a SCS ranging from 15 kHz to 480 kHz.

Figure 5:
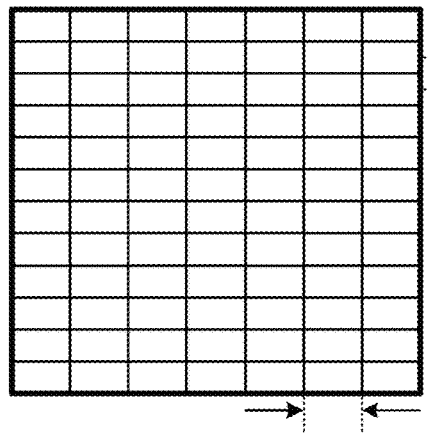
FIG. 5 illustrates resource blocks having nominal and scaled numerologies.
Figure 5:
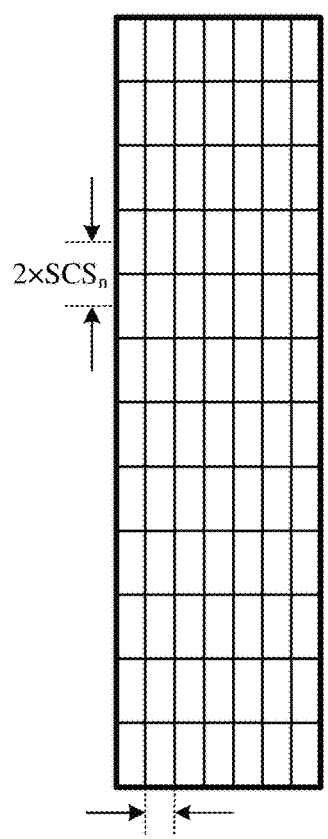

FIG. 5 illustrates certain aspects of a scalable numerology 500 in which a first RB 502 has a nominal numerology, and a second RB 504 has a scaled numerology. As one example, the first RB 502 may have a 'nominal' subcarrier spacing ($SCS_n$) of 30 kHz, and a 'nominal' symbol duration$_n$ of 333 µs. Here, in the second RB 504, the scaled numerology includes a scaled SCS of double the nominal SCS, or $2 \times SCS_n = 60$ kHz. Because this provides twice the bandwidth per symbol, it results in a shortened symbol duration to carry the same information. Thus, in the second RB 504, the scaled numerology includes a scaled symbol duration of half the nominal symbol duration, or (symbol duration$_n$)÷2=167 µs.

Figure 6:
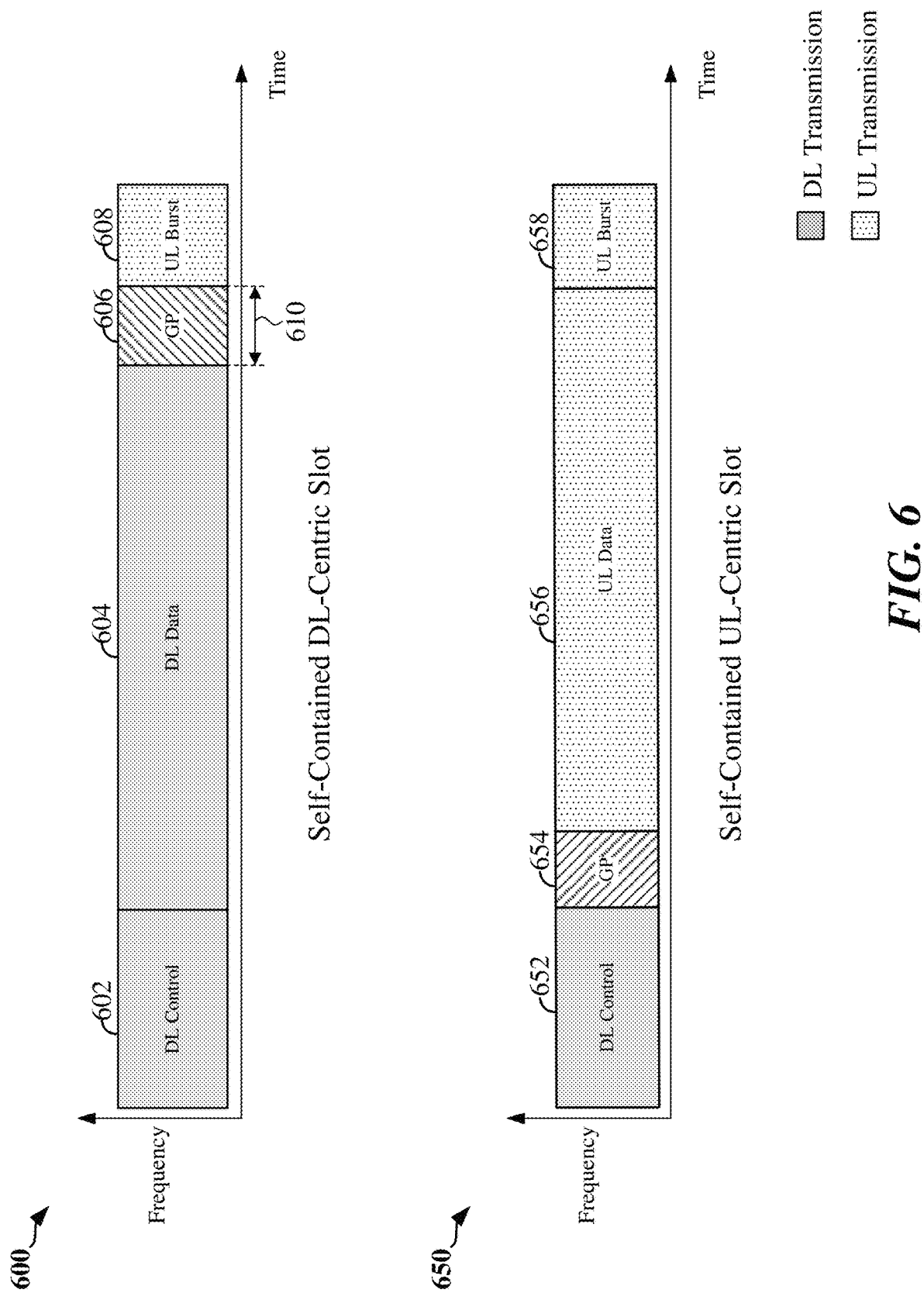
FIG. 6 is a schematic illustration of exemplary self-contained slots according to some aspects of the disclosure.

According to an aspect of the disclosure, one or more slots may be structured as self-contained slots. For example, FIG. 6 illustrates two example structures of self-contained slots 600 and 650. The self-contained slots 600 and/or 650 may be used, in some examples, in place of the slot 410 described above and illustrated in FIG. 4.

In the illustrated example, a DL-centric slot 600 may be a transmitter-scheduled slot. The nomenclature DL-centric generally refers to a structure wherein more resources are allocated for transmissions in the DL direction (e.g., transmissions from the scheduling entity 208 to the scheduled entity 206). Similarly, an UL-centric slot 650 may be a receiver-scheduled slot, wherein more resources are allocated for transmissions in the UL direction (e.g., transmissions from the scheduled entity 206 to the scheduling entity 208).

Each slot, such as the self-contained slots 600 and 650, may include transmit (Tx) and receive (Rx) portions. For example, in the DL-centric slot 600, the scheduling entity 208 first has an opportunity to transmit control information, e.g., on a PDCCH, in a DL control region 602, and then an opportunity to transmit DL user data or traffic, e.g., on a PDSCH in a DL data region 604. Following a guard period (GP) region 606 having a suitable duration 610, the scheduling entity 208 has an opportunity to receive UL data and/or UL feedback including any UL scheduling requests, CSF, a HARQ ACK/NACK, etc., in an UL burst 608 from other entities using the carrier. Here, a slot such as the DL-centric slot 600 may be referred to as a self-contained slot when all of the data carried in the DL data region 604 is scheduled in the DL control region 602 of the same slot; and further, when all of the data carried in the DL data region 604 is acknowledged (or at least has an opportunity to be acknowledged) in the UL burst 608 of the same slot. In this way, each self-contained slot may be considered a self-contained entity, not necessarily requiring any other slot to complete a scheduling-transmission-acknowledgment cycle for any given packet.

The GP region 606 may be included to accommodate variability in UL and DL timing. For example, latencies due to radio frequency (RF) antenna direction switching (e.g., from DL to UL) and transmission path latencies may cause the scheduled entity 206 to transmit early on the UL to match DL timing. Such early transmission may interfere with symbols received from the scheduling entity 208. Accordingly, the GP region 606 may allow an amount of time after the DL data region 604 to prevent interference, where the GP region 606 provides an appropriate amount of time for the scheduling entity 208 to switch its RF antenna direction, an appropriate amount of time for the over-the-air (OTA) transmission, and an appropriate amount of time for ACK processing by the scheduled entity.

Similarly, the UL-centric slot 650 may be configured as a self-contained slot. The UL-centric slot 650 is substantially similar to the DL-centric slot 600, including a guard period 654 provided between a DL control region 652 and an UL data region 656, followed by an UL burst region 658.

The slot structure illustrated in slots 600 and 650 is merely one example of self-contained slots. Other examples may include a common DL portion at the beginning of every slot, and a common UL portion at the end of every slot, with various differences in the structure of the slot between these respective portions. Other examples still may be provided within the scope of the present disclosure.

Figure 7:
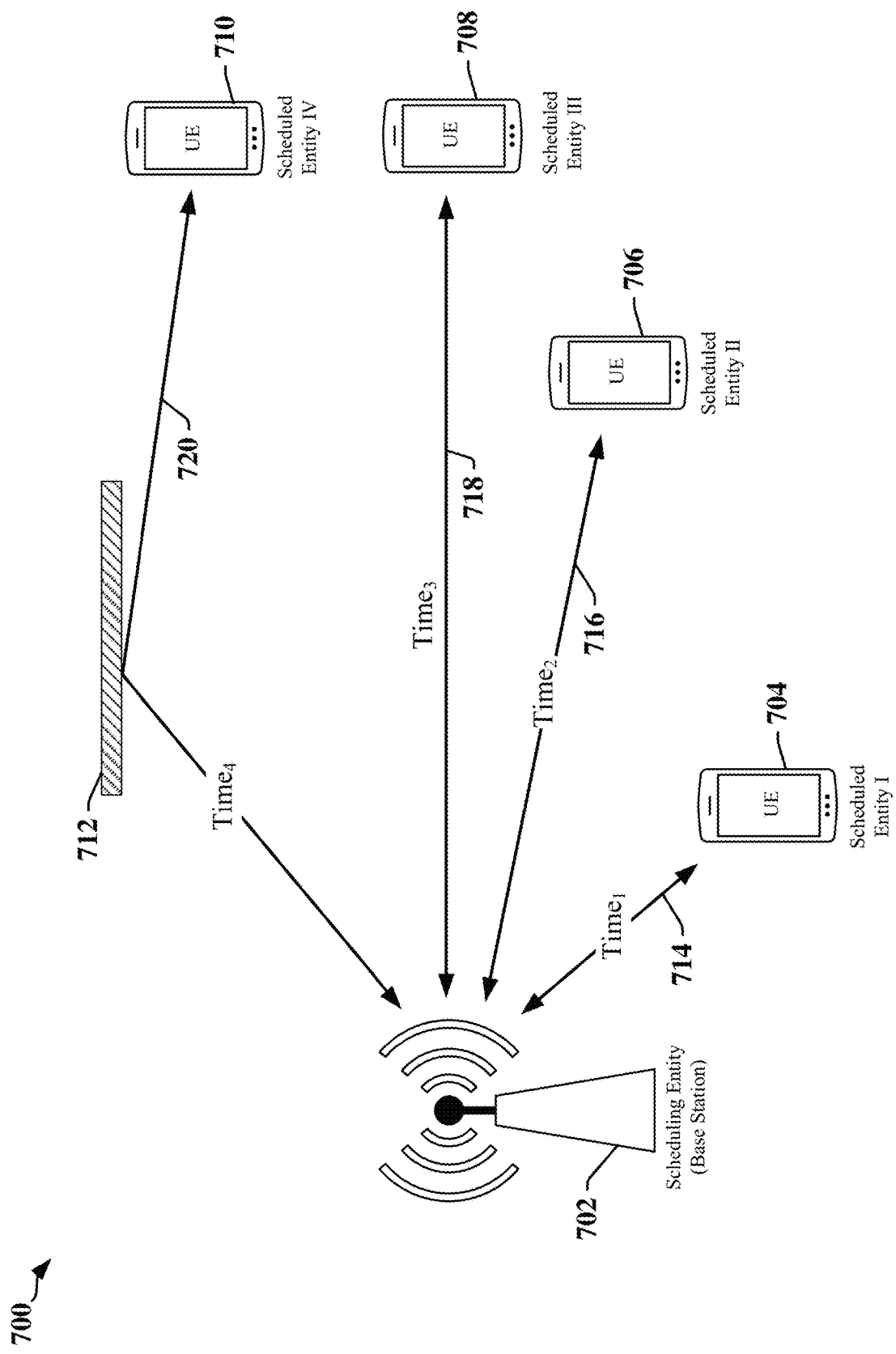
FIG. 7 illustrates propagation delays in a radio access network that may be adapted in accordance with certain aspects of the disclosure.

Timing advance is used to cause signals transmitted from multiple UEs to arrive synchronously at a base station. FIG. 7 illustrates an example of a radio access network 700 in which four UEs 704, 706, 708, 710 are in active communication with a base station 702. Each UE 704, 706, 708, 710 experiences a propagation delay ($Time_1$-$Time_4$) attributable to characteristics of the respective propagation paths 714, 716, 718, 720 between the base station 702 and UEs 704, 706, 708, 710. In the example, two UEs 708, 710 are located at substantially the same physical distance from the base station 702 and further from the base station 702 than the other two UEs 704, 706, of which one UE 704 is closest to the base station 702. The greatest propagation delay ($Time_4$) in the example is associated with a propagation path 720 that involves one or more reflections off a building or surface 712. Reflections may be significant in urban environments. Propagation delays may include delays introduced by a repeating device, and by other aspects of the physical environment covered by the radio access network 700.

In various radio access technologies, individualized timing advance information is provided to the UEs 704, 706, 708, 710 that cause the UEs 704, 706, 708, 710 to advance uplink transmissions. The net effect of the timing advance information and consequent advancing of uplink transmission, is to cause transmissions from each UE 704, 706, 708, 710 to arrive at the same time at the base station 702. Each UE 704, 706, 708, 710 applies a negative offset to its scheduled transmission time, causing the transmission to commence earlier than scheduled.

In the exemplified radio access network 700, the UE 710 with the greatest propagation delay adjusts timing for its scheduled uplink transmission such that it begins transmitting earlier than a UE 704, 706, 708 that is associated with a lesser propagation delay.

The base station 702 may calculate timing advance durations based on round-trip timing. Each UE 704, 706, 708, 710 may calculate a reference time from the arrival time of the downlink subframe. The reference time may then be used to determine uplink subframe timing schedule and an adjusted transmission schedule based on the corresponding timing advance value for the UE 704, 706, 708, 710. The Timing Advance may be based on twice the propagation delay under the assumption that the same propagation delay value applies to both downlink and uplink transmissions.

Timing advance in an LTE network, for example, provides that UEs 704, 706, 708, 710 adjust the timing of their respective transmissions with a relative accuracy better than or equal to $\pm 4 \times Ts$ seconds, where Ts is a basic time unit defined by 3GPP. In the LTE example, $Ts=1/(15000 \times 2048)$ seconds Timing advance commands are expressed in multiples of $16 \times Ts$ relative to current uplink timing. A single step size is defined for an LTE network.

A timing advance (TA) command is sent in a random access channel (RACH) during a random access procedure involving initial access of the radio access network 700 by a UE 704, 706, 708, 710. The TA command is provided by the scheduling entity (base station 702) in a random access response (RAR) that provides a TA value that depends on cell size.

A TA command sent while the UE 704, 706, 708, 710 is in a connect and/or idle state has a granularity of 16×Ts, and the value is expressed in 6 bits. The fixed number of bits results in a trade-off between accuracy and maximum range supported by the radio access network 700. A number of factors affect TA step size or granularity, including:

Cell size, CP length, and/or tone (subcarrier) spacing.
Use of sub-6 GHZ and millimeter wave.
HARQ time line.
Different services, e.g., URLLC or eMBB.

TA duration may vary for each UE 704, 706, 708, 710. For example, the UE 704, 706, 708, 710 may be subject to different mobility characteristics (speed) and/or a strong path jump.

Timing Advance in 5G NR

Certain aspects disclosed herein provide improved timing advance for 5G NR radio access networks Timing advance in 5G NR radio access networks may be subject to further variations and/or restrictions with respect to earlier radio access technologies. For example, 5G NR may support different numerologies and may be used to implement a radio access network that supports scalable numerology. The radio access network may support different step sizes for subcarrier spacing (SCS) (e.g., n×15 kHz) and corresponding scalable CP length. Various different services may be implemented, including enhanced mobile broadband, and ultra-reliable and low-latency communication. Different HARQ timing may be implemented: n+x timing, where x=0, 1, 2, 3, 4 HARQs.

According to certain aspects, 5G NR radio access network numerology may be handled using a TA step size that can be scaled according to CP length. In one example, one step size may be defined for all SCS. In another example, one step size may be defined individually for each SCS. In a further example, one step size may be defined for one or more SCS groups. When step size is defined per SCS group, as one example, one step size may be defined for the group {115 kHz/30 kHz/60 kHz}, one step size may be defined for the group {120 kHz/240 kHz}, and one step size may be defined for the single member group {480 kHz}. In some other examples, SCS may be grouped differently.

In some implementations, different step sizes may be defined for the same SCS (e.g., 60 KHz) in sub-6 GHZ and/or millimeter wave. Different step sizes may be defined for the same SCS in licensed and unlicensed bands.

According to certain aspects, the number of bits assigned for a TA command may be fixed or variable in a 5G NR radio access network.

In a first example, the number of bits assigned for a TA command is fixed, and the maximum timing advance value may be reduced when smaller step sizes are used. For example, with Ts defined in the same way as LTE, when an 11-bit TA value is defined for initial access, the 5G NR radio access network may have the following characteristics:

With 16 Ts TA step size for 15 kHz SCS, the maximum TA is 667 µs or 100 km.
With 8 Ts TA step size for 30 kHz/60 kHz SCS group, the maximum TA is 333 µs or 50 km.
With 4 Ts TA step size for 120 kHz/240 kHz SCS group, the maximum TA is 167 µs or 25 km.

When a 6-bit TA value is defined for connect and/or idle state and the 5G NR radio access network may have the following characteristics:

With 16 Ts TA step size for 15 kHz SCS, the maximum TA is 32.8 µs
With 8 Ts TA step size for 30 kHz/60 kHz SCS group, the maximum TA is 16.4 µs
With 4 Ts TA step size for 120 kHz/240 kHz SCS group, the maximum TA is 8.2 µs.

Variable TA step sizes and/or variable numbers of bits representing TA duration may be defined for a 5G NR radio access network. For example, an 8 Ts TA step size may be defined for 15 kHz SCS, with 12 bits for initial access and/or 8 bits for connected states.

In a second example, the number of bits assigned for a TA command may vary with numerology. That is, different numbers of bits may be used for different numerologies. In some instances, an 11-bit TA value may be used with a TA step size of 16 Ts for 15 kHz SCS to provide a maximum TA of 667 µs or 100 km. A 10-bit TA value may be used with a TA step size of 8 Ts for 30 kHz/60 kHz SCS to provide a maximum TA of 167 µs or 25 km.

According to certain aspects, timing advance in a 5G NR radio access network may be configured to accommodate different HARQ time lines. For example, the maximum TA and/or TA step size may be smaller for shorter HARQ time lines. In some instances, HARQ timing may be shorter when self-contained slots are transmitted.

According to certain aspects, timing advance in a 5G NR radio access network may be configured to accommodate different services. In some implementations, the maximum TA and/or TA step size may be reduced when URLCC is employed. Even in the same cell, URLLC UEs may have smaller coverage than enhanced mobile broadband (eMBB) UEs. Larger timing jumps may be experienced by millimeter wave implementations than by sub-6 GHZ implementations. A larger step size or larger number of bits may be employed to accommodate larger TA ranges.

Scheduling Entity

Figure 8:
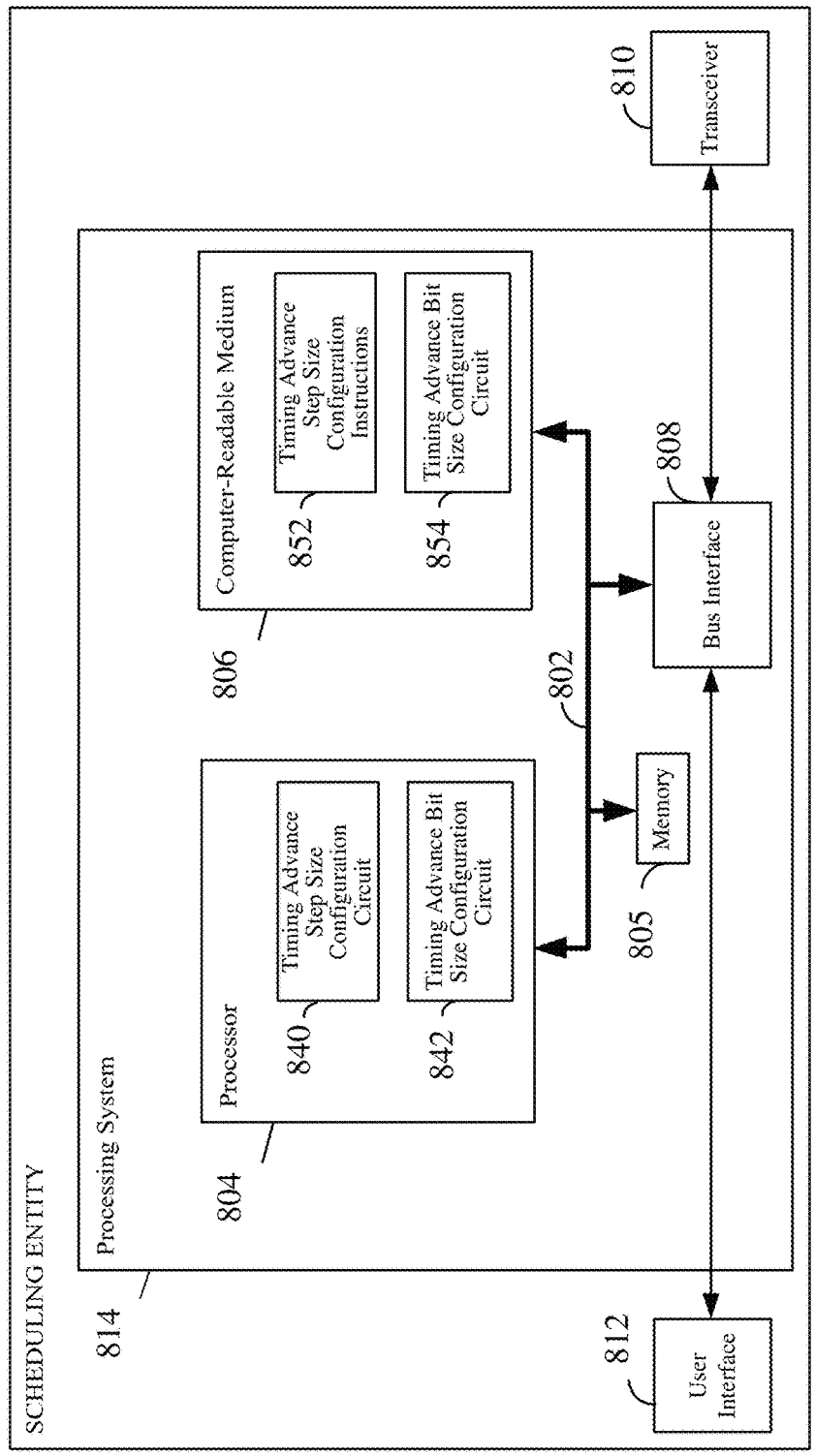
FIG. 8 is a block diagram conceptually illustrating an example of a hardware implementation for a scheduling entity according to some aspects of the disclosure.

FIG. 8 is a block diagram illustrating an example of a hardware implementation for a scheduling entity 800 employing a processing system 814. For example, the scheduling entity 800 may be a user equipment (UE) as illustrated in any one or more of FIG. 1 or 2, or referenced elsewhere herein. In another example, the scheduling entity 800 may be a base station as illustrated in any one or more of FIG. 1 or 2.

The scheduling entity 800 may be implemented with a processing system 814 that includes one or more processors 804. Examples of processors 804 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the scheduling entity 800 may be configured to perform any one or more of the functions described herein. That is, the processor 804, as utilized in a scheduling entity 800, may be used to implement any one or more of the processes and procedures described below and illustrated in FIG. 10.

In this example, the processing system 814 may be implemented with a bus architecture, represented generally by the bus 802. The bus 802 may include any number of interconnecting buses and bridges depending on the specific application of the processing system 814 and the overall design constraints. The bus 802 communicatively couples together various circuits including one or more processors (represented generally by the processor 804), a memory 805, and computer-readable media (represented generally by the computer-readable medium 806). The bus 802 may also link various other circuits such as timing sources, peripherals, voltage regulators, and power management circuits, which are well known in the art, and therefore, will not be described any further. A bus interface 808 provides an interface between the bus 802 and a transceiver 810. The transceiver 810 provides a communication interface or means for communicating with various other apparatus over a transmission medium. Depending upon the nature of the apparatus, a user interface 812 (e.g., keypad, display, speaker, microphone, joystick) may also be provided.

In some aspects of the disclosure, the processor 804 may include circuitry 840 configured for various functions, including, for example, calculating and/or determining timing advance step size for a radio access network that supports scalable numerology. The processor 804 may include circuitry 842 configured for various functions, including, for example, calculating and/or determining bit size for representing a timing delay transmitted to a UE coupled to the radio access network. For example, the circuitry may be configured to implement one or more of the functions described below, including in relation to FIG. 10.

The processor 804 is responsible for managing the bus 802 and general processing, including the execution of software stored on the computer-readable medium 806. The software, when executed by the processor 804, causes the processing system 814 to perform the various functions described below for any particular apparatus. The computer-readable medium 806 and the memory 805 may also be used for storing data that is manipulated by the processor 804 when executing software.

One or more processors 804 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 806. The computer-readable medium 806 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium 806 may reside in the processing system 814, external to the processing system 814, or distributed across multiple entities including the processing system 814. The computer-readable medium 806 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

Figure 10:
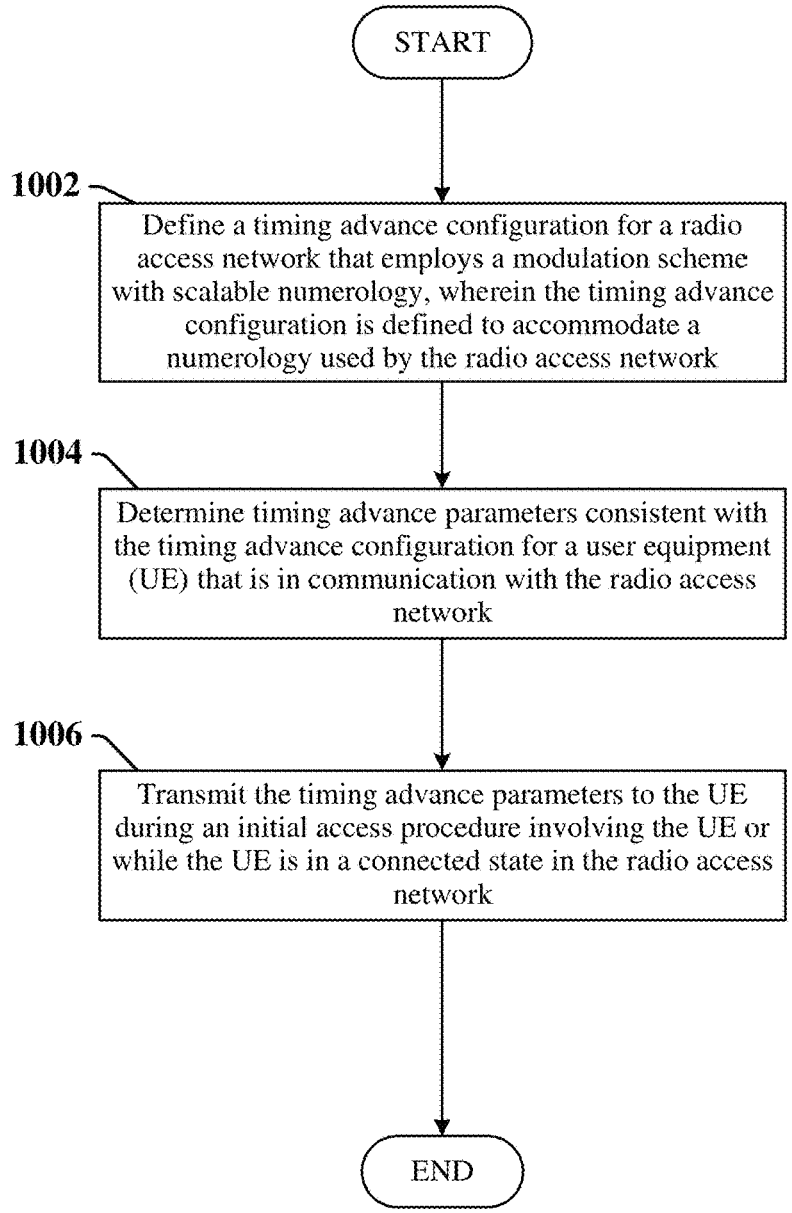
FIG. 10 is a flow chart illustrating a process in accordance with certain aspects of the disclosure.

In one or more examples, the computer-readable medium 806 may include software configured for various functions, including, for example, performing one or more of the functions associated with the process 1000 of FIG. 10. In one example, the computer-readable medium 806 stores computer-executable code 852, 854 configured to cause the processing system 814 to define a timing advance configuration for a radio access network that employs a modulation scheme with scalable numerology.

Scheduled Entity

Figure 9:
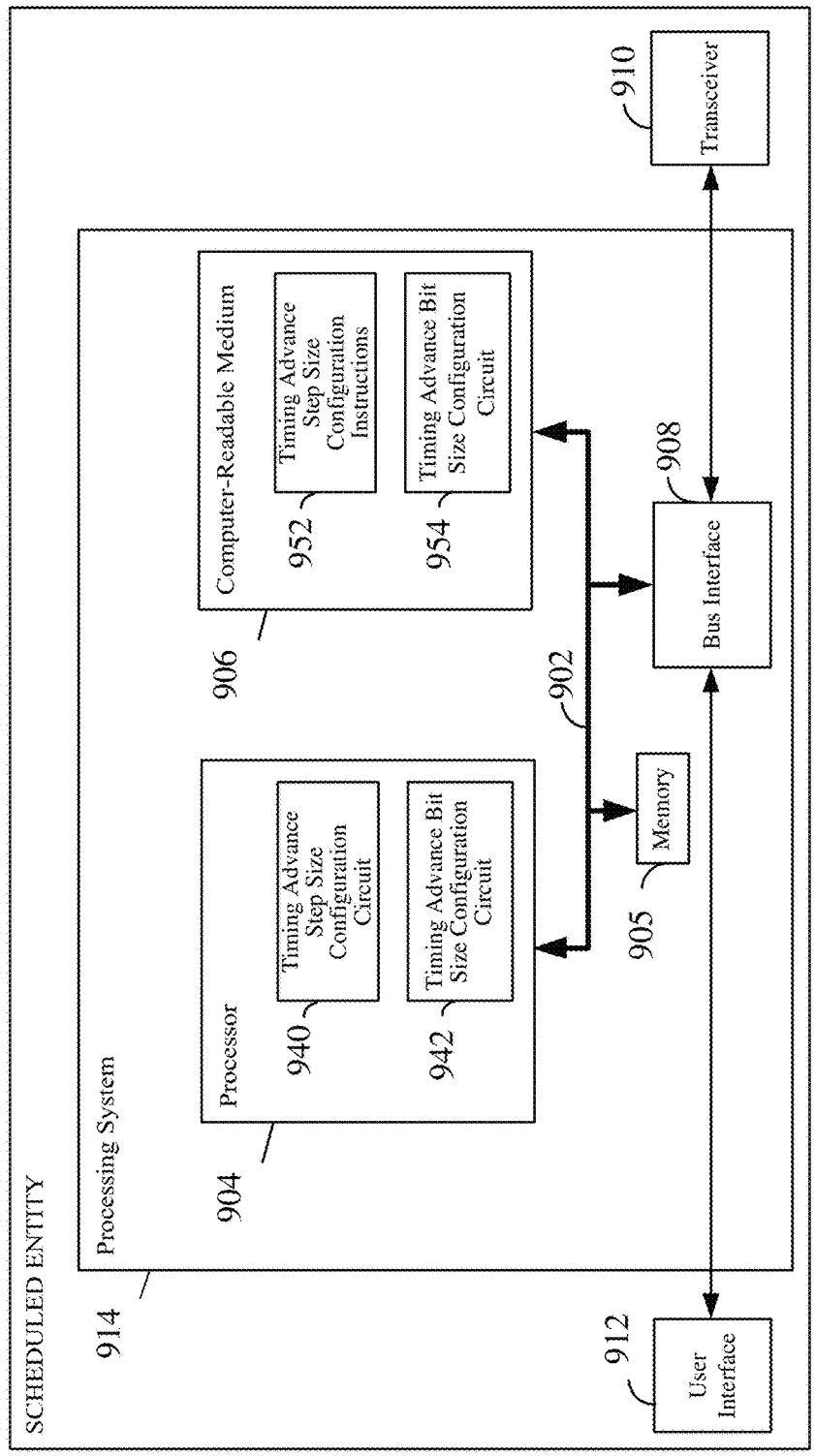
FIG. 9 is a block diagram conceptually illustrating an example of a hardware implementation for a scheduled entity according to some aspects of the disclosure.

FIG. 9 is a conceptual diagram illustrating an example of a hardware implementation for an exemplary scheduled entity 900 employing a processing system 914. In accordance with various aspects of the disclosure, an element, or any portion of an element, or any combination of elements may be implemented with a processing system 914 that includes one or more processors 904. For example, the scheduled entity 900 may be a user equipment (UE) as illustrated in any one or more of FIG. 1 or 2, or referenced elsewhere herein.

The processing system 914 may be substantially the same as the processing system 814 illustrated in FIG. 8, including a bus interface 908, a bus 902, memory 905, a processor 904, and a computer-readable medium 906. In one or more examples, the computer-readable medium 906 may include software 952, 954 configured for various functions, including, for example, performing one or more of the functions associated with the process 1000 of FIG. 10.

Furthermore, the scheduled entity 900 may include a user interface 912 and a transceiver 910 substantially similar to those described above in FIG. 8. That is, the processor 904, as utilized in a scheduled entity 900, may be used to implement any one or more of the processes described below and illustrated in FIG. 10.

In some aspects of the disclosure, the processor 904 may include circuitry 940 configured for various functions, including, for example, determining timing advance step size for a radio access network that supports scalable numerology. The processor 904 may include circuitry 942 configured for various functions, including, for example, calculating and/or determining bit size for representing a timing delay transmitted to a UE coupled to the radio access network. For example, the circuitry may be configured to implement one or more of the functions described below, including in relation to FIG. 10.

FIG. 10 is a flow chart illustrating a process 1000 in accordance with some aspects of the present disclosure. As described below, some or all illustrated features may be omitted in a particular implementation within the scope of the present disclosure, and some illustrated features may not be required for implementation of all embodiments. In some examples, the process 1000 may be carried out by the scheduling entity 800 illustrated in FIG. 8. In one example, the process may be implemented in part or in whole using circuitry 840 that is configured for calculating and/or determining timing advance step size for a radio access network that supports scalable numerology. In one example, the process may be implemented in part or in whole using circuitry 842 configured for calculating and/or determining bit size for representing a timing delay transmitted to a UE coupled to the radio access network. In other examples, the process 1000 may be carried out by any suitable apparatus or means for carrying out the functions or algorithm described below.

At block 1002, the scheduling entity may define a timing advance configuration for a radio access network that employs a modulation scheme with scalable numerology.

The timing advance configuration may be defined to accommodate a numerology used by the radio access network.

At block 1004, the scheduling entity may determine timing advance parameters consistent with the timing advance configuration for a UE that is in communication with the radio access network.

At block 1006, the scheduling entity may transmit the timing advance parameters to the UE during an initial access procedure involving the UE or while the UE is in a connected state in the radio access network.

The timing advance configuration may be defined by configuring a timing advance step size for one or more subcarrier spacing defined for the radio access network. The timing advance configuration may be defined by configuring a timing advance step size for all subcarrier spacings defined for the radio access network.

In some instances, a group of subcarrier spacings is defined for the radio access network. The timing advance configuration may be defined by configuring a timing advance step size for subcarrier spacings in the group of subcarrier spacings. In one example, the group of subcarrier spacings includes subcarrier spacings of 15 kHz, 30 kHz and 60 kHz. In another example, the group of subcarrier spacings includes subcarrier spacings of 120 kHz and 240 kHz.

In some instances, a group of cyclic prefix lengths is defined for the radio access network, and the timing advance configuration may be defined by configuring a timing advance step size for each cyclic prefix length in the group of cyclic prefix lengths.

In some examples, defining the timing advance configuration includes configuring a number of bits used to express a timing advance duration transmitted to the UE in the timing advance parameters. The timing advance configuration may be defined by configuring a timing advance step size for one or more subcarrier spacings defined for the radio access network. The timing advance step size and the number of bits used to express the timing advance value may be selected to obtain a maximum timing advance duration or range of the radio access network with a desired timing advance granularity. The desired timing advance granularity may be determined by HARQ time lines. The timing advance configuration may be defined by configuring a timing advance step size for one or more subcarrier spacings defined for the radio access network. The timing advance step size and the number of bits used to express the timing advance value may be selected to obtain a maximum timing advance duration defined by the radio access network for HARQ.

In one example, defining the timing advance configuration includes configuring the number of bits used to express the timing advance duration based on a timing advance step size for one or more subcarrier spacings defined for the radio access network.

In one example, defining the timing advance configuration includes configuring a first number of bits used to express the timing advance duration when the UE is configured to operate as an eMBB UE, and configuring a second number of bits used to express the timing advance duration when the UE is configured to operate as an URLLC UE.

In one example, defining the timing advance configuration includes configuring a first timing advance step size when the UE is configured to operate as an eMBB UE, and configuring a second timing advance step size when the UE is configured to operate as an URLLC UE.

In one example, defining the timing advance configuration includes configuring one or more timing advance step size for subcarrier spacings based on frequency ranges used by the radio access network. The radio access network may be configurable to use bandwidths associated with sub-6 GHz frequencies and millimeter wavelengths.

According to certain aspects disclosed herein, an apparatus for wireless communication includes means for defining a timing advance configuration for a radio access network that employs a modulation scheme with scalable numerology, adapted to define the timing advance configuration to accommodate a numerology used by the radio access network, means for determining timing advance parameters consistent with the timing advance configuration for a UE that is in communication with the radio access network, and means for transmitting the timing advance parameters to the UE during an initial access procedure involving the UE or while the UE is in a connected state in the radio access network.

In one example, the means for defining the timing advance configuration may be adapted to configure a timing advance step size for one or more subcarrier spacing defined for the radio access network. The means for defining the timing advance configuration may be adapted to configure a timing advance step size for all subcarrier spacings defined for the radio access network.

In various examples, a group of subcarrier spacings is defined for the radio access network, and the means for defining the timing advance configuration is adapted to configure a timing advance step size for subcarrier spacings in the group of subcarrier spacings. The means for defining the timing advance configuration may be adapted to configure a cyclic prefix length for each subcarrier spacing in the group of subcarrier spacings.

In some examples, the means for defining the timing advance configuration may be adapted to configure a number of bits used to express a timing advance duration transmitted to the UE in the timing advance parameters based on a timing advance step size for one or more subcarrier spacings defined for the radio access network. The means for defining the timing advance configuration may be adapted to configure a timing advance step size for one or more subcarrier spacings defined for the radio access network. The timing advance step size and the number of bits used to express the timing advance duration may be selected to obtain a maximum timing advance duration or range of the radio access network with a desired timing advance granularity. The means for defining the timing advance configuration may be adapted to configure a timing advance step size for one or more subcarrier spacings defined for the radio access network. The timing advance step size and the number of bits used to express the timing advance duration may be selected to obtain a maximum timing advance duration defined by the radio access network for HARQ.

In certain implementations, the means for defining the timing advance configuration may be adapted to configure a first number of bits used to express a timing advance duration when the UE is configured to operate as an eMBB UE, and configure a second number of bits used to express the timing advance duration when the UE is configured to operate as an URLLC UE. The means for defining the timing advance configuration may be adapted to configure a first timing advance step size when the UE is configured to operate as an eMBB UE, and configure a second timing advance step size when the UE is configured to operate as an URLLC UE. The means for defining the timing advance configuration may be adapted to configure one or more timing advance step size for subcarrier spacings based on frequency ranges used by the radio access network. The radio access network may be configurable to use bandwidths associated with sub-6 GHz frequencies and millimeter wavelengths.

According to certain aspects, an apparatus for wireless communication has a processor, a transceiver communicatively coupled to the at least one processor, and a memory communicatively coupled to the at least one processor. The processor may be configured to define a timing advance configuration for a radio access network that employs a modulation scheme with scalable numerology, determine timing advance parameters consistent with the timing advance configuration for a UE that is in communication with the radio access network, and transmit the timing advance parameters to the UE during an initial access procedure involving the UE or while the UE is in a connected state in the radio access network. The timing advance configuration is defined to accommodate a numerology used by the radio access network.

A group of subcarrier spacings may be defined for the radio access network, and the processor may be configured to configure a timing advance step size for subcarrier spacings in the group of subcarrier spacings. The processor may be configured to configure a timing advance step size for one or more subcarrier spacings defined for the radio access network. The timing advance step size and the number of bits used to express the timing advance duration may be selected to obtain a maximum timing advance duration or range of the radio access network with a desired timing advance granularity.

Several aspects of a wireless communication network have been presented with reference to an exemplary implementation. As those skilled in the art will readily appreciate, various aspects described throughout this disclosure may be extended to other telecommunication systems, network architectures and communication standards.

By way of example, various aspects may be implemented within other systems defined by 3GPP, such as Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated herein may be rearranged and/or combined into a single component, step, feature or function or embodied in several components, steps, or functions. Additional elements, components, steps, and/or functions may also be added without departing from novel features disclosed herein. The apparatus, devices, and/or components illustrated herein may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

What is claimed is:

1. A method for configuring timing advance, comprising:
providing a timing advance command for a radio access network that employs a modulation scheme with a scalable numerology, wherein the timing advance command accommodates the scalable numerology used by the radio access network, wherein providing the timing advance command comprises configuring a number of bits used to express a timing advance duration to a user equipment (UE), wherein the number of bits is a first number of bits when the UE is in an initial access procedure with the radio access network, wherein the number of bits is a second number of bits when the UE is in a connected state in the radio access network, and wherein the first number of bits is greater than the second number of bits for a common timing advance step size;

determining a timing advance step size for the UE when the UE is in communication with the radio access network, the timing advance step size being associated with one or more subcarrier spacings defined for the radio access network, wherein the timing advance step size is scaled in accordance with the one or more subcarrier spacings defined for the radio access network and used to calculate the timing advance duration included in the timing advance command; and transmitting the timing advance command to the UE, wherein the timing advance command includes the first number of bits used to express the timing advance duration when the UE is in the initial access procedure with the radio access network, and wherein the timing advance command includes the second number of bits used to express the timing advance duration when the UE is in the connected state in the radio access network.

2. The method of claim 1, wherein providing the timing advance command comprises:

configuring timing advance step sizes for all subcarrier spacings defined for the radio access network.

3. The method of claim 1, wherein the timing advance step size is associated with a group of two or more subcarrier spacings defined for the radio access network.

4. The method of claim 3, wherein the group of two or more subcarrier spacings includes subcarrier spacings of at least one of 120 kHz or 240 kHz.

5. The method of claim 1, wherein a group of cyclic prefix lengths is defined for the radio access network, and wherein providing the timing advance command comprises:

configuring a timing advance step size for each cyclic prefix length in the group of cyclic prefix lengths.

6. The method of claim 1, wherein providing the timing advance command comprises:

configuring respective timing advance step sizes for the the one or more subcarrier spacings defined for the radio access network, wherein the timing advance step size for the UE and at least one of the first number of bits or the second number of bits are selected to obtain a maximum timing advance duration or a maximum range of the radio access network with a desired timing advance granularity.

7. The method of claim 6, wherein the desired timing advance granularity is determined by a hybrid automatic repeat request (HARQ) time line.

8. The method of claim 1, wherein at least one of the first number of bits or the second number of bits are each based on the timing advance step size for the one or more subcarrier spacings defined for the radio access network.

9. The method of claim 1, wherein providing the timing advance command comprises:

configuring a third number of bits used to express the timing advance duration when the UE is configured to operate as an enhanced mobile broadband (eMBB) UE; and configuring a fourth number of bits used to express the timing advance duration when the UE is configured to operate as an ultra-reliable-low latency communications (URLLC) UE.

10. The method of claim 1, wherein providing the timing advance command comprises:

configuring a first timing advance step size when the UE is configured to operate as an enhanced mobile broadband (eMBB) UE; and configuring a second timing advance step size when the UE is configured to operate as an ultra-reliable-low latency communications (URLLC) UE.

11. The method of claim 1, wherein providing the timing advance command comprises: configuring one or more timing advance step sizes for the one or more subcarrier spacings based on frequency ranges used by the radio access network, wherein the radio access network is configurable to use bandwidths associated with sub-6 GHz frequencies and millimeter wavelengths.

12. An apparatus for wireless communication, comprising:

means for providing a timing advance command for a radio access network that employs a modulation scheme with a scalable numerology, wherein the timing advance command accommodates the scalable numerology used by the radio access network, wherein providing the timing advance command comprises configuring a number of bits used to express a timing advance duration to a user equipment (UE), wherein the number of bits is a first number of bits when the UE is in an initial access procedure with the radio access network, wherein the number of bits is a second number of bits when the UE is in a connected state in the radio access network, and wherein the first number of bits is greater than the second number of bits for a common timing advance step size;

means for determining a timing advance step size for the UE when the UE is in communication with the radio access network, the timing advance step size being associated with a group of two or more subcarrier spacings defined for the radio access network, wherein the timing advance step size is scaled in accordance with the group of two or more subcarrier spacings defined for the radio access network and used to calculate the timing advance duration included in the timing advance command; and means for transmitting the timing advance command to the UE, wherein the timing advance command includes the first number of bits used to express the timing advance duration when the UE is in the initial access procedure with the radio access network, and wherein the timing advance command includes the second number of bits used to express the timing advance duration when the UE is in the connected state in the radio access network.

13. An apparatus for wireless communication, comprising: means for providing a timing advance command for a radio access network that employs a modulation scheme with a scalable numerology, wherein the timing advance command accommodates the scalable numerology used by the radio access network, wherein providing the timing advance command comprises configuring a number of bits used to express a timing advance duration to a user equipment (UE), wherein the number of bits is a first number of bits when the UE is in an initial access procedure with the radio access network, wherein the number of bits is a second number of bits when the UE is in a connected state in the radio access network, and wherein the first number of bits is greater than the second number of bits for a common timing advance step size;

means for determining a timing advance step size for the UE when the UE is in communication with the radio access network, the timing advance step size being associated with one or more subcarrier spacings defined for the radio access network, wherein the timing advance step size is scaled in accordance with the one or more subcarrier spacings defined for the radio access network and used to calculate the timing advance duration included in the timing advance command; and means for transmitting the timing advance command to the UE, wherein the timing advance command includes the first number of bits used to express the timing advance duration when the UE is in the initial access procedure with the radio access network, and wherein the timing advance command includes the second number of bits used to express the timing advance duration when the UE is in the connected state in the radio access network.

14. The apparatus of claim 12, wherein a group of cyclic prefix lengths is defined for the radio access network, and wherein the means for providing the timing advance command is adapted to:
configure a timing advance step size for subcarrier spacings in the group of cyclic prefix lengths.

15. The apparatus of claim 12, wherein a group of cyclic prefix lengths is defined for the radio access network, and wherein the means for providing the timing advance command is adapted to:
configure a timing advance step size for each cyclic prefix length in the group of cyclic prefix lengths.

16. The apparatus of claim 12, wherein the first number of bits and the second number of bits are each based on the timing advance step size associated with the one or more subcarrier spacings defined for the radio access network.

17. The apparatus of claim 12, wherein the means for providing the timing advance command is adapted to:
configure a third number of bits used to express the timing advance duration when the UE is configured to operate as an enhanced mobile broadband (eMBB) UE; and
configure a fourth number of bits used to express the timing advance duration when the UE is configured to operate as an ultra-reliable-low latency communications (URLLC) UE.

18. The apparatus of claim 12, wherein the means for providing the timing advance command is adapted to:
configure a first timing advance step size when the UE is configured to operate as an enhanced mobile broadband (eMBB) UE; and
configure a second timing advance step size when the UE is configured to operate as an ultra-reliable-low latency communications (URLLC) UE.

19. The apparatus of claim 12, wherein the means for providing the timing advance command is adapted to: configure one or more timing advance step sizes for the one or more subcarrier spacings based on frequency ranges used by the radio access network, wherein the radio access network is configurable to use bandwidths associated with sub-6 GHz frequencies and millimeter wavelengths.

20. An apparatus for wireless communication, comprising: at least one processor; a transceiver communicatively coupled to the at least one processor; and a memory communicatively coupled to the at least one processor, wherein the at least one processor is configured to: provide a timing advance command for a radio access network that employs a modulation scheme with a scalable numerology, wherein the timing advance command accommodates the scalable numerology used by the radio access network, wherein providing the timing advance command comprises configuring a number of bits used to express a timing advance duration to a user equipment (UE), wherein the number of bits is a first number of bits when the UE is in an initial access procedure with the radio access network, wherein the number of bits is a second number of bits when the UE is in a connected state in the radio access network, and wherein the first number of bits is greater than the second number of bits for a common timing advance step size; determine a timing advance step size for the UE when the UE is in communication with the radio access network, the timing advance step size being associated with one or more subcarrier spacings defined for the radio access network, wherein the timing advance step size is scaled in accordance with the one or more subcarrier spacings defined for the radio access network and used to calculate the timing advance duration included in the timing advance command; and transmit the timing advance command to the UE, wherein the timing advance command includes the first number of bits used to express the timing advance duration when the UE is in the initial access procedure with the radio access network, and wherein the timing advance command includes the second number of bits used to express the timing advance duration when the UE is in the connected state in the radio access network.

21. The apparatus of claim 20, wherein a group of cyclic prefix lengths is defined for the radio access network, and wherein the at least one processor is configured to:
configure a timing advance step size for each cyclic prefix length in the group of cyclic prefix lengths.

22. A non-transitory computer-readable medium storing computer-executable code, comprising code for causing a computer to:
provide a timing advance command for a radio access network that employs a modulation scheme with a scalable numerology, wherein the timing advance command accommodates the scalable numerology used by the radio access network, wherein providing the timing advance command comprises configuring a number of bits used to express a timing advance duration to a user equipment (UE), wherein the number of bits is a first number of bits when the UE is in an initial access procedure with the radio access network, wherein the number of bits is a second number of bits when the UE is in a connected state in the radio access network, and wherein the first number of bits is greater than the second number of bits for a common timing advance step size;
determine a timing advance step size for the UE when the UE is in communication with the radio access network, the timing advance step size being associated with the one or more subcarrier spacings defined for the radio access network, wherein the timing advance step size is scaled in accordance with the one or more subcarrier spacings defined for the radio access network and used to calculate the timing advance duration included in the timing advance command; and
transmit the timing advance command to the UE, wherein the timing advance command includes the first number of bits used to express the timing advance duration when the UE is in the initial access procedure with the radio access network, and wherein the timing advance command includes the second number of bits used to express the timing advance duration when the UE is in the connected state in the radio access network.

23. The method of claim 1, wherein the group of two or more subcarrier spacings includes subcarrier spacings of at least two of 15 kHz, 30 kHz or 60 kHz.

24. The apparatus of claim 12, wherein the timing advance step size is associated with a group of two or more subcarrier spacings defined for the radio access network.

25. The apparatus of claim 20, wherein the timing advance step size is associated with a group of two or more subcarrier spacings defined for the radio access network.

26. The non-transitory computer-readable medium of claim 22, wherein the timing advance step size is associated with a group of two or more subcarrier spacings defined for the radio access network.

27. An apparatus for wireless communication, comprising:
at least one processor; a transceiver communicatively coupled to the at least one processor; and
a memory communicatively coupled to the at least one processor, wherein the at least one processor is configured to:
receive a timing advance command from a radio access network that employs a modulation scheme with a scalable numerology,
wherein the timing advance command accommodates the scalable numerology used by the radio access network, wherein the timing advance command comprises a number of bits used to express a timing advance duration, wherein the number of bits is a first number of bits when the apparatus is in an initial access procedure with the radio access network, wherein the number of bits is a second number of bits when the apparatus is in a connected state in the radio access network, and wherein the first number of bits is greater than the second number of bits for a common timing advance step size,
wherein the timing advance duration is based on a timing advance step size that is associated with one or more subcarrier spacings defined for the radio access network and is scaled in accordance with the one or more subcarrier spacings defined for the radio access network; and
communicate with the radio access network based on the timing advance command.

28. The apparatus of claim 27, wherein:
the timing advance command comprises a third number of bits used to express the timing advance duration when the apparatus is configured to operate as an enhanced mobile broadband (eMBB) apparatus; and
the timing advance command comprises a fourth number of bits used to express the timing advance duration when the apparatus is configured to operate as an ultra-reliable-low latency communications (URLLC) apparatus.

29. The apparatus of claim 27, wherein:
the timing advance duration is based on a first timing advance step size when the apparatus is configured to operate as an enhanced mobile broadband (eMBB) apparatus; and
the timing advance duration is based on a second timing advance step size when the apparatus is configured to operate as an ultra-reliable-low latency communications (URLLC) apparatus.

30. A method for wireless communication at a user equipment (UE), comprising:
receiving a timing advance command from a radio access network that employs a modulation scheme with a scalable numerology,
wherein the timing advance command accommodates the scalable numerology used by the radio access network, wherein the timing advance command comprises a number of bits used to express a timing advance duration,
wherein the number of bits is a first number of bits when the apparatus is in an initial access procedure with the radio access network, wherein the number of bits is a second number of bits when the apparatus is in a connected state in the radio access network, and wherein the first number of bits is greater than the second number of bits for a common timing advance step size, wherein the timing advance duration is based on a timing advance step size that is associated with one or more subcarrier spacings defined for the radio access network and is scaled in accordance with the one or more subcarrier spacings defined for the radio access network; and
communicating with the radio access network based on the timing advance command.

31. The method of claim 30, wherein:
the timing advance command comprises a third number of bits used to express the timing advance duration when the UE is configured to operate as an enhanced mobile broadband (eMBB) UE; and
the timing advance command comprises a fourth number of bits used to express the timing advance duration when the UE is configured to operate as an ultra-reliable-low latency communications (URLLC) UE.

32. The method of claim 30, wherein:
the timing advance duration is based on a first timing advance step size when the UE is configured to operate as an enhanced mobile broadband (eMBB) UE; and
the timing advance duration is based on a second timing advance step size when the UE is configured to operate as an ultra-reliable-low latency communications (URLLC) UE.

* * * * *